US011550332B2

(12) United States Patent
Takai et al.

(10) Patent No.: US 11,550,332 B2
(45) Date of Patent: Jan. 10, 2023

(54) AUTONOMOUS MOVING APPARATUS CONTROL SYSTEM, AUTONOMOUS MOVING APPARATUS CONTROL METHOD, AND A NON-TRANSITORY COMPUTER READABLE MEDIUM

(71) Applicant: TOYOTA JIDOSHA KABUSHIKI KAISHA, Toyota (JP)

(72) Inventors: Tomohisa Takai, Nagoya (JP); Yuhei Yamaguchi, Toyota (JP); Satoshi Toyoshima, Okazaki (JP); Yuta Watanabe, Toyota (JP); Mikio Honda, Toyota (JP); Shiro Oda, Anjyo (JP); Tetsuya Taira, Nagakute (JP); Nobuhisa Otsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 440 days.

(21) Appl. No.: 16/837,327

(22) Filed: Apr. 1, 2020

(65) Prior Publication Data
US 2020/0363817 A1    Nov. 19, 2020

(30) Foreign Application Priority Data
May 13, 2019    (JP) .............................. JP2019-090775

(51) Int. Cl.
*G01C 22/00* (2006.01)
*G05D 3/00* (2006.01)
(Continued)

(52) U.S. Cl.
CPC ......... *G05D 1/0244* (2013.01); *B66B 1/3461* (2013.01); *B66B 1/3492* (2013.01);
(Continued)

(58) Field of Classification Search
CPC ............... G05D 1/0244; G05D 1/0234; G05D 2201/0216; B66B 1/3461; B66B 1/3492;
(Continued)

(56) References Cited

U.S. PATENT DOCUMENTS 9,026,301 B2    5/2015 Zini et al.
2011/0208745 A1*    8/2011 Dietsch ................. G05D 1/024
707/743
(Continued)

FOREIGN PATENT DOCUMENTS

CN    105074602 A    11/2015
CN    109095299 A    12/2018
JP    2011-088721 A    5/2011

*Primary Examiner* — Abby Y Lin
*Assistant Examiner* — Sohana Tanju Khayer
(74) *Attorney, Agent, or Firm* — Oliff PLC

(57) ABSTRACT

An autonomous moving apparatus control system including a range sensor, a reflection plate, and a control unit. The range sensor is installed in a cage of an elevator and detects a distance to an object by receiving reflected light of signal light applied to the object. The reflection plate is disposed in an elevator hall of a floor on which the elevator stops, and reflects the signal light. The control unit determines whether or not a mobile robot, which is an autonomous moving apparatus, can get on and off the elevator based on a detected distance, the detected distance being a distance to the reflection plate detected by the range sensor.

12 Claims, 22 Drawing Sheets

(51) Int. Cl.
*G05D 1/02* (2020.01)
*B66B 1/34* (2006.01)
(52) U.S. Cl.
CPC . *G05D 1/0234* (2013.01); *G05B 2219/31003* (2013.01); *G05B 2219/31006* (2013.01); *G05B 2219/31007* (2013.01); *G05D 2201/0216* (2013.01); *Y02P 90/60* (2015.11)
(58) Field of Classification Search
CPC .... G05B 19/41895; G05B 2219/31003; G05B 2219/31006; G05B 2219/31007; Y02P 90/60
See application file for complete search history.

(56) References Cited

U.S. PATENT DOCUMENTS

| | | | |
|---|---|---|---|
| 2012/0041593 A1* | 2/2012 | Ichinose | B66B 1/2458 700/258 |
| 2016/0282873 A1 | 9/2016 | Masaki et al. | |
| 2019/0210849 A1* | 7/2019 | High | B60L 53/63 |
| 2019/0352135 A1* | 11/2019 | Herkel | B66B 13/143 |
| 2019/0383939 A1* | 12/2019 | Mori | G05B 19/41895 |
| 2020/0055695 A1* | 2/2020 | Inoue | B66B 1/3492 |
| 2020/0198929 A1* | 6/2020 | Michel | G01D 5/142 |

* cited by examiner

AUTONOMOUS MOVING APPARATUS CONTROL SYSTEM, AUTONOMOUS MOVING APPARATUS CONTROL METHOD, AND A NON-TRANSITORY COMPUTER READABLE MEDIUM

CROSS REFERENCE TO RELATED APPLICATIONS

This application is based upon and claims the benefit of priority from Japanese patent application No. 2019-090775, filed on May 13, 2019, the disclosure of which is incorporated herein in its entirety by reference.

BACKGROUND

The present disclosure relates to an autonomous moving apparatus control system.

The development of autonomous moving apparatuses that autonomously move in certain buildings and facilities is advancing. By equipping such an autonomous moving apparatus with a parcel carrier, it can be used as an automatic delivery apparatus that automatically delivers parcels. The automatic delivery apparatus can deliver, for example, a parcel loaded at a starting place to a destination by autonomously traveling from the starting point to the destination.

For example, an automatic delivery apparatus disclosed in U.S. Pat. No. 9,026,301 includes an autonomously movable tractor part and a parcel carrier part. Further, a computer provided in them stores electronic maps of floor plans of buildings and routes that the automatic delivery apparatus follows when it moves from one place to the next place. The above-described automatic delivery apparatus also includes an onboard electronic device that enables the automatic delivery apparatus to take over the control of an elevator by directly communicating with an elevator system of a building.

SUMMARY

Since the above-described automatic delivery apparatus uses an elevator, it can move across a plurality of floors. In order to enable the automatic delivery apparatus and the elevator system to directly communicate with each other, it is necessary to configure both the automatic delivery apparatus and the elevator system so that they can communicate with each other in advance. However, when such an automatic delivery apparatus is introduced into an existing facility, it is desired to have a technique by which the automatic delivery apparatus can easily use an elevator without making any significant changes to the existing elevator system.

The present disclosure has been made in order to solve the above-described problem and provides an autonomous moving apparatus control system that can be easily installed in order to enable an autonomous moving apparatus to use an elevator.

A first exemplary aspect is an autonomous moving apparatus control system including a range sensor, a reflection plate, and a control unit. The range sensor is installed in a cage of an elevator and detects a distance to an object by receiving reflected light of signal light applied to the object. The reflection plate is disposed in an elevator hall on a floor on which the elevator stops (hereinafter referred to as an "elevator-stop floor"), and reflects the signal light. The control unit determines whether or not an autonomous moving apparatus can get on or off the elevator based on a detected distance, the detected distance being a distance to the reflection plate detected by the range sensor.

In this way, the control unit can determine whether or not the autonomous moving apparatus can get on or off the elevator according to the distance to the reflection plate detected by the range sensor on a certain elevator-stop floor.

In the above-described autonomous moving apparatus control system, a plurality of reflection plates may be disposed on respective elevator-stop floors in such a manner that distances between the range sensor and these reflection plates are different from one another. In this way, the autonomous moving apparatus control system can determine whether or not the autonomous moving apparatus can get on or off the elevator on the elevator-stop floor according to the detected distance.

In the above-described autonomous moving apparatus control system, the control unit may detect the elevator-stop floor based on the detected distance. In this way, the autonomous moving apparatus control system can detect the elevator-stop floor according to the detected distance.

In the above-described autonomous moving apparatus control system, the control unit may determine that the autonomous moving apparatus can get on or off the elevator when the detected distance on the elevator-stop floor is within a target range for that floor, the target range being one of a plurality of target ranges defined for the respective elevator-stop floors on which the autonomous moving apparatus gets on and off the elevator. In this way, the autonomous moving apparatus control system can detect the elevator-stop floor according to the detected distance.

In the above-described autonomous moving apparatus control system, a length of the reflection plate in a vertical direction may be set according to a length of a level difference between a floor surface of the cage and a floor surface of the elevator hall at a stop position of the cage. In this way, the autonomous moving apparatus control system determines that the autonomous moving apparatus can get on or off the elevator when the level difference between the floor surfaces is shorter than a predetermined length.

In the above-described autonomous moving apparatus control system, the reflection plate may include a reflection surface inclined with respect to the vertical direction, and the inclination of the reflection surface may be set according to the length of the level difference between the floor surface of the cage and the floor surface of the elevator hall at the stop position of the cage. Further, the inclination of the reflection surface may be set so that an absolute value of a difference between a reference detection distance and a first detected distance becomes larger than an absolute value of a difference between the reference detection distance and a second detected distance, the reference detection distance being a distance that is detected when the level difference is zero, the first detected distance being a distance that is detected when the level difference is a first distance having a value other than zero, and the second detected distance being a distance that is detected when the level difference is a second distance shorter than the first distance. In this way, the autonomous moving apparatus control system can determine whether or not the autonomous moving apparatus can get on or off the elevator according to the length of the level difference between the floor surfaces.

In the above-described autonomous moving apparatus control system, the control unit may have a safe getting on/off feasible range, the safe getting on/off feasible range being a range of distances within which the autonomous moving apparatus can safely get on or off the elevator. Further, the control unit may determine that the autonomous moving apparatus can get on or off the elevator when the detected distance on the elevator-stop floor is within the corresponding safe getting on/off feasible range. Further, the control unit may determine that the autonomous moving apparatus cannot get on or off the elevator when the detected distance is not within the safe getting on/off feasible range. In this way, the autonomous moving apparatus control system can enable the autonomous moving apparatus to get on or off the elevator in a state where it can safely get on or off the elevator.

In the above-described autonomous moving apparatus control system, the range sensor may also detect an unopened-door state in which an elevator door exists between the range sensor and the reflection plate, and the control unit may make the determination based on a change in the detected distance including whether or not the elevator door is in the unopened-door state. In this way, the autonomous moving apparatus control system can control the autonomous moving apparatus according to the movement of the elevator door.

According to the present disclosure, it is possible to provide an autonomous moving apparatus control system that can be easily installed in order to enable an autonomous moving apparatus to use an elevator.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be explained through embodiments of the present disclosure. However, they are not intended to limit the scope of the present disclosure according to the claims. Further, all of the components/structures described in the embodiments are not necessarily indispensable as means for solving the problem. For clarifying the explanation, the following description and the drawings are partially omitted and simplified as appropriate. The same symbols are assigned to the same elements throughout the drawings and duplicated explanations are omitted as appropriate.

First Embodiment

Embodiments according to the present disclosure will be described hereinafter with reference to the drawings. An autonomous moving apparatus control system 10 is a system that controls an autonomous moving apparatus according to the state of an elevator in order to enable the autonomous moving apparatus to use the elevator.

Figure 1:
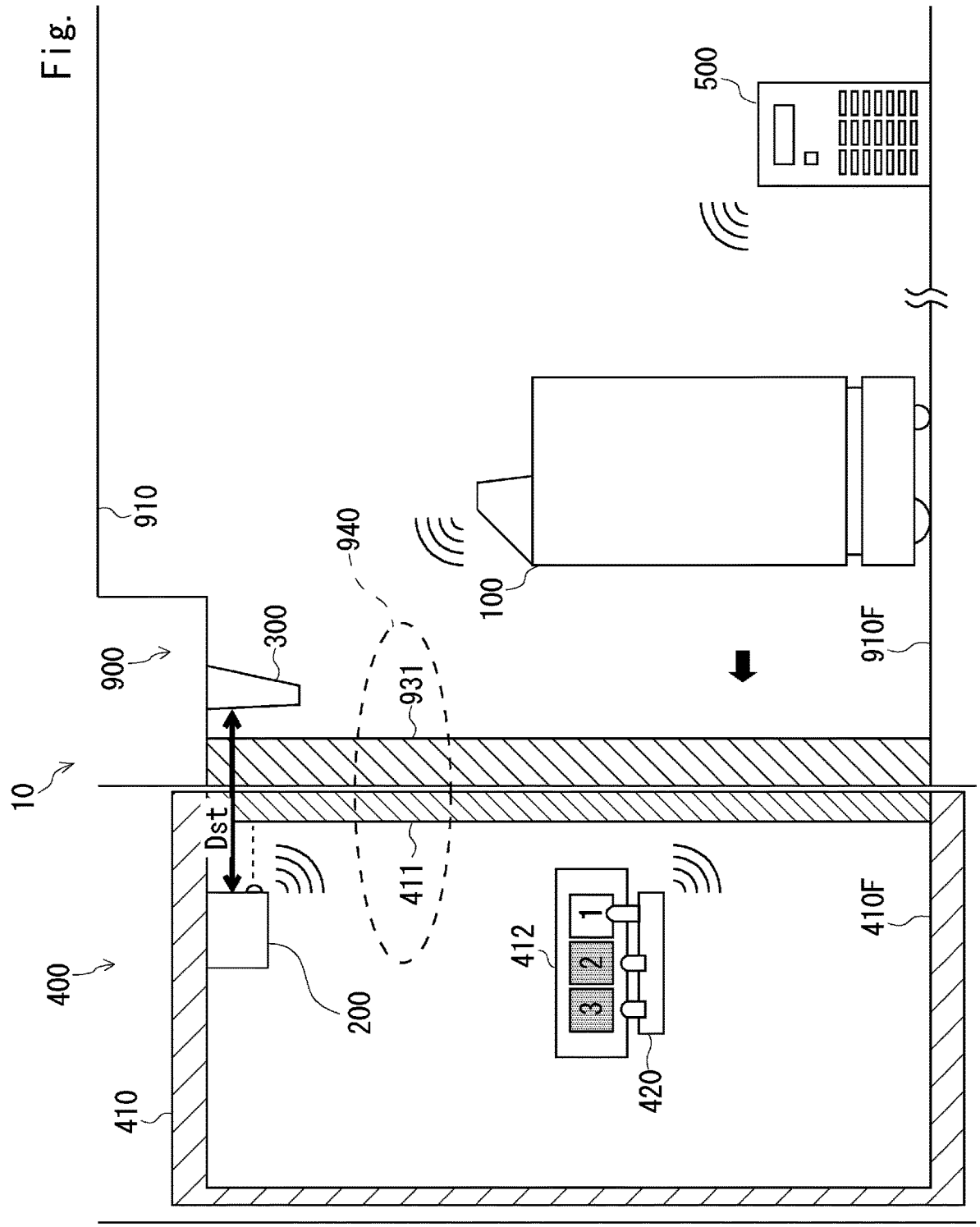
FIG. 1 is a schematic diagram of an autonomous moving apparatus control system according to a first embodiment.

FIG. 1 is a schematic diagram of an autonomous moving apparatus control system according to a first embodiment. The autonomous moving apparatus control system 10 is provided in order to enable a mobile robot 100 to use an elevator 400 installed in a building 900.

The building 900 and the elevator 400 are briefly explained hereinafter. In the building 900, there is an elevator hall 910 adjacent to the elevator 400 on each of the floors on which a cage 410 of the elevator 400 stops. Further, in the elevator hall 910, there is a floor door 931 between the elevator hall 910 and the cage 410. When the cage 410 is moving, the floor doors 931 on all the floors are closed. When the cage 410 is stopped on a certain floor, the floor door 931 on that floor on which the cage 410 is stopped (hereinafter also referred to as a "cage-stop floor" or an "elevator-stop floor") temporarily opens in an interlocking manner with a cage door 411 of the cage 410 and then closes before the cage 410 starts moving.

The cage 410 is a box-shaped structure that accommodates people and/or objects, and moves up or down in a place adjoining the elevator hall 910. The cage 410 includes the cage door 411 disposed on the side facing the floor door 931. On each of certain elevator-stop floors, the cage door 411 opens and closes in an interlocking manner with the floor door 931 of that elevator-stop floor.

Note that in the following description, it is assumed that when one of the floor door 931 and the cage door 411 is opened, the other door is also opened in an interlocking manner. Therefore, for example, when the floor door 931 is in an opened-door state, the cage door 411, which is interlocked with the floor door 931, is also in an opened-door state. However, the description of such a state may be omitted. Further, in the following description, the floor door 931 and the cage door 411 may be collectively referred to as an elevator door 940.

The above-described autonomous moving apparatus control system 10 installed in the building 900 and the elevator 400 includes a mobile robot 100, a distance detection apparatus 200, a reflection plate 300, an elevator operation apparatus 420, and a server apparatus 500.

The mobile robot 100 is an example of an autonomous moving object that can autonomously travel. The mobile robot 100 is a moving apparatus that moves on a floor of the building 900, and moves on a floor surface 910F of the elevator hall 910, a floor surface 410F of the cage 410 of the elevator 400, and so on. Further, the mobile robot 100 includes a storage cabinet for conveying certain parcels. Therefore, the mobile robot 100 can convey a certain parcel from one place to another place.

Figure 2:
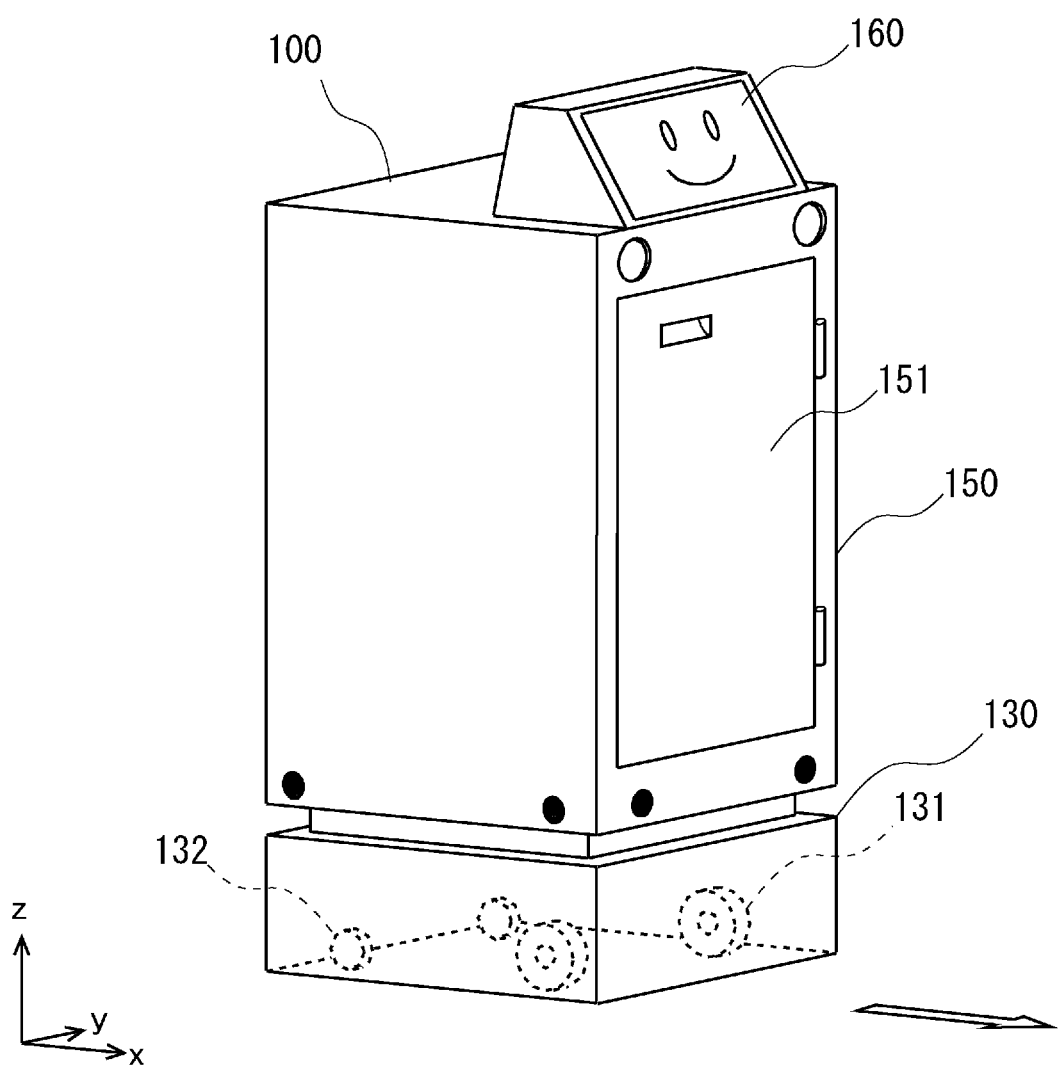
FIG. 2 is an overview of a mobile robot.

The mobile robot 100 will be further described with reference to FIG. 2. FIG. 2 is a schematic view of the mobile robot 100. Note that in FIG. 2, a right-handed orthogonal coordinate system is shown for the sake of convenience for explaining a positional relation among components. Further, in the following description, when an orthogonal coordinate system is shown, its X-, Y- and Z-axis directions coincide with the X-, Y- and Z-axis directions of the orthogonal coordinate system shown in FIG. 2.

The mobile robot 100 is a moving object whose rectangular-parallelepiped main body moves on the floor surface which serves as the surface on which the mobile robot 100 moves. The mobile robot 100 includes a drive unit 130 as moving means. The drive unit 130 includes two drive wheels 131 that are in contact with the floor surface and configured so as to be able to independently rotate about one rotation axis extending in a direction (a lateral direction or the y-axis direction in FIG. 2) perpendicular to a straight-traveling direction (a longitudinal direction or the x-axis direction in FIG. 2), and casters 132 that are in contact with the floor surface. The mobile robot 100 moves forward or backward by driving the left and right drive wheels 131 at the same rotational speed, and turns (or rotates) by driving the left and right drive wheels 131 at different rotational speeds or in different rotational directions.

The mobile robot 100 includes a housing part 150 above the driving part 130. The housing part 150 includes a storage cabinet door 151. When the storage cabinet door 151 is opened, a storage cabinet for storing certain objects to be conveyed is provided inside the housing part 150. A display unit 160 is provided above the housing part 150. A touch panel is disposed over the display unit 160. A user performs a certain operation on the display unit 160 while viewing images displayed thereon.

The autonomous moving apparatus control system 10 is further described with reference to FIG. 1 again. The distance detection apparatus 200 includes a reflection-type range sensor and detects (i.e., measures) a distance to an object by receiving reflected light of signal light applied to the object. The distance detection apparatus 200 is fixed to a ceiling surface of the cage 410. Further, the range sensor is disposed so that when the cage door 411 and the floor door 931 are opened, it emits signal light toward the elevator hall 910, i.e., emits the signal light to the outside of the cage 410.

The reflection plate 300 is disposed on the ceiling surface of the elevator hall 910 and is configured so as to reflect the signal light emitted from the distance detection apparatus 200. A distance Dst between the distance detection apparatus 200 and the reflection plate 300 is set so that each floor has a different distance Dst. The reflection plate 300 is made of any solid material that reflects the signal light. For example, the reflection plate 300 is made of a relatively lightweight material such as a plastic or aluminum plate, and is fixed to the ceiling surface of the elevator hall 910 by means of bonding, screwing, or the like.

The elevator operation apparatus 420 is an apparatus that operates an operation panel 412 disposed in the cage 410. The elevator operation apparatus 420 includes an actuator for stopping the elevator on a desired elevator-stop floor, and presses a button corresponding to the elevator-stop floor according to an instruction received from the server apparatus 500. The elevator operation apparatus 420 is fixed near the operation panel 412 by means of bonding, screwing, or the like.

The server apparatus 500 is connected to each component of the autonomous moving apparatus control system 10 so that it can communicate with each component. Further, the server apparatus 500 receives signals from those components as appropriate and sends instructions to those components. The server apparatus 500 is, for example, a computer having a communication function. The server apparatus 500 may be installed in any location as long as it can communicate with each component of the autonomous moving apparatus control system 10.

Figure 3:
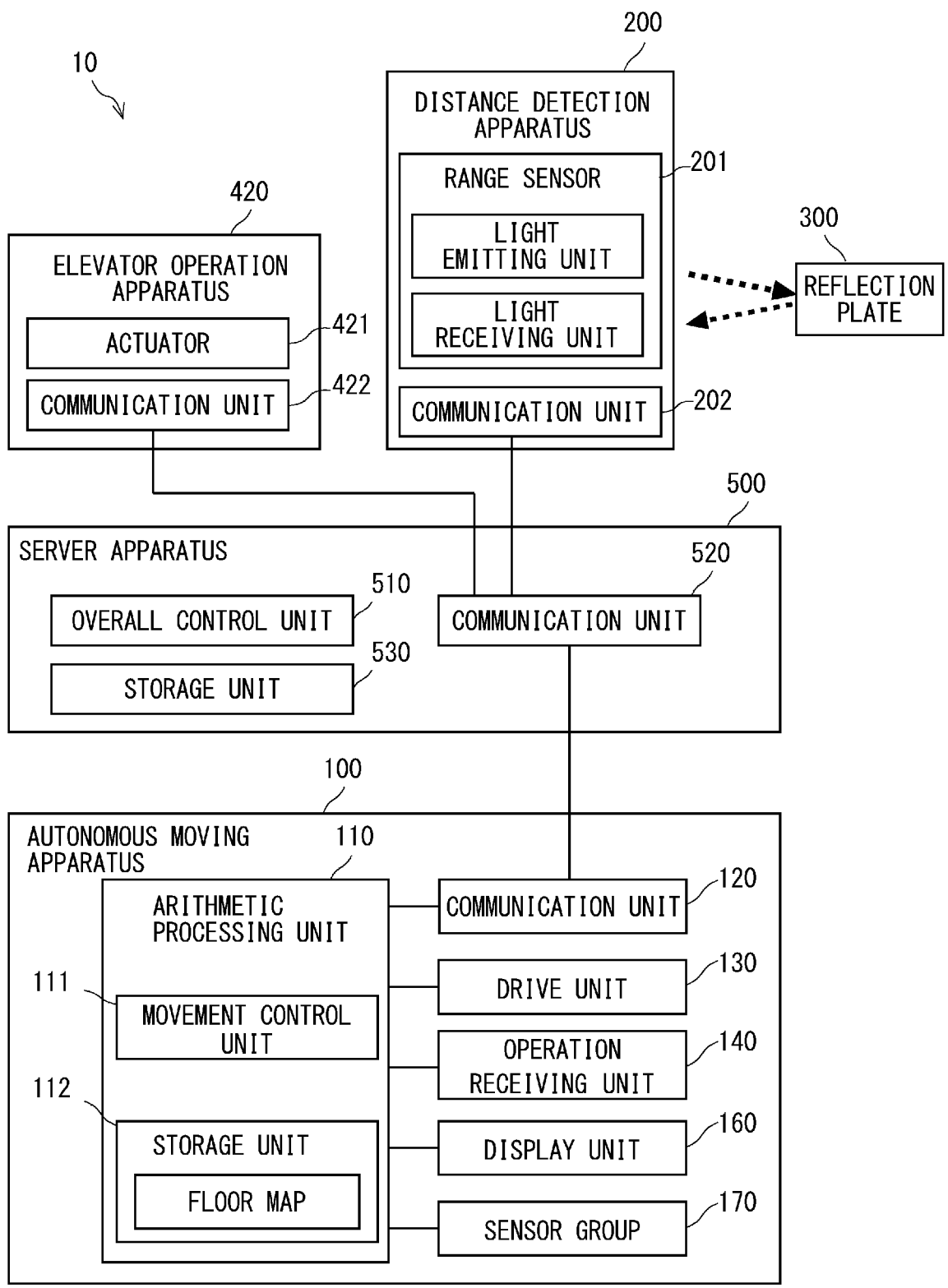
FIG. 3 is a block diagram of the autonomous moving apparatus control system according to the first embodiment.

Next, the functions of the autonomous moving apparatus control system 10 will be further described with reference to FIG. 3. FIG. 3 is a block diagram of an autonomous moving apparatus control system according to the first embodiment. The autonomous moving apparatus control system 10 includes a mobile robot 100, a distance detection apparatus 200, a reflection plate 300, an elevator operation apparatus 420, and a server apparatus 500.

The mobile robot 100 includes, as main components, an arithmetic processing unit 110, a communication unit 120, a drive unit 130, an operation receiving unit 140, a display unit 160, and a group of sensors (hereinafter referred to as a sensor group) 170.

The arithmetic processing unit 110 is an information processing apparatus including an arithmetic unit such as a CPU (Central Processing Unit), and includes a movement control unit 111 and a storage unit 112. The movement control unit 111 has a function of performing calculation to generate an instruction that is provided to the drive unit 130 based on information acquired from the sensor group 170.

The storage unit 112 includes a nonvolatile memory such as a flash memory and an SSD (Solid State Drive), and stores, for example, a floor map of the building 900 that the mobile robot 100 uses to perform an autonomous movement.

The communication unit 120 is an interface through which the mobile robot 100 is connected to the server apparatus 500 so that it can communicate with the server apparatus 500. Further, the communication unit 120 includes, for example, an antenna and a circuit for modulating or demodulating a signal that is transmitted through the antenna. The communication unit 120 receives, from the server apparatus 500, information about a destination and information as to whether or not the mobile robot 100 can move. Further, the communication unit 120 transmits information about the state of the mobile robot 100 itself to the server apparatus 500.

The drive unit 130 includes a drive circuit and motors for driving the drive wheels 131. Further, the drive unit 130 also includes rotary encoders that detect the amounts of rotations of the drive wheels 131. The drive unit 130 is a drive unit that drives the drive wheels 131 and drives the drive wheels 131 according to drive signals generated by the movement control unit 111.

The operation receiving unit 140 receives an input operation from a user and transmits an operation signal to the arithmetic processing unit 110. As means for receiving an input operation from a user, the operation receiving unit 140 includes, for example, operation buttons, a touch panel disposed over the display unit 160, etc. For example, a user turns on/off a power supply and/or opens/closes the storage cabinet door 151 by operating the above-described input operation means.

The display unit 160 is a display unit including, for example, a liquid crystal panel and displays information as appropriate according to an instruction from the calculation processing unit 110.

The sensor group 170 includes sensors that acquire data necessary for the mobile robot 100 to perform an autonomous movement. The sensors included in the sensor group 170 are, for example, a range sensor that measures a distance to an object located around the mobile robot 100, an odometry sensor for detecting the numbers of revolutions of the drive wheels 131, a gyro sensor, etc. The sensor group 170 supplies the detected data to the arithmetic processing unit 110.

The distance detection apparatus 200 includes a range sensor 201 and a communication unit 202 as main components. The range sensor 201 is a reflection-type range sensor that includes a light emitting part and a light receiving part, and measures a distance to an object by receiving reflected light, i.e., return light of signal light emitted by the light emitting part. The range sensor 201 detects a distance at a predetermined timing such as at intervals of 500 milliseconds. The light emitting part of the range sensor 201 is configured so that it applies signal light to the cage door 411 when the cage door 411 is closed and applies the signal light to the reflection plate 300 when the cage door 411 is opened. The communication unit 202 transmits a signal relating to a detected distance, i.e., a distance detected by the range sensor 201 to the server apparatus 500. Note that the signal light is not limited to visible light, and may include infrared light and ultraviolet light.

The reflection plate 300 is disposed in the elevator hall 910 on each of the elevator-stop floors on which the elevator 400 stops, and reflects signal light emitted by the range sensor 201. In this embodiment, each of a plurality of reflection plates 300 is disposed on a respective one of the elevator-stop floors of the elevator 400 in such a manner that the distances between the range sensor 201 disposed in the elevator 400 and these reflection plates 300 are different from one floor to another floor.

The elevator operation apparatus 420 includes an actuator 421 and a communication unit 422 as its main components. The communication unit 422 receives an instruction signal relating to the elevator-stop floor from the server apparatus 500. The communication unit 422 supplies the received instruction signal to the actuator 421. In response to the received instruction signal, the actuator 421 drives the actuator corresponding to the indicated elevator-stop floor. The actuator 421 is configured so that the actuator, which corresponds to the respective one of the elevator-stop floors, presses a button corresponding to the elevator-stop floor indicated by the server apparatus 500.

The server apparatus 500 includes an overall control unit 510, a communication unit 520, and a storage unit 530 as its main components.

The overall control unit 510 includes an arithmetic unit such as a CPU and performs various information processing operations. The overall control unit 510 receives a signal relating to a detected distance from the distance detection apparatus 200 and detects (i.e., determines) the floor on which the cage 410 is stopped based on the received signal. Further, the overall control unit 510 determines whether or not the mobile robot 100 can get on or off the elevator 400 based on the signal received from the distance detection apparatus 200. Further, the overall control unit 510 outputs an indication as to whether or not the mobile robot 100 can get on or off the elevator 400 to the mobile robot 100 according to the aforementioned determination.

The communication unit 520 individually communicates with the mobile robot 100, the distance detection apparatus 200, and the elevator operation apparatus 420. The communication unit 520 supplies signals received from these components to the overall control unit 510. Further, the communication unit 520 transmits signals supplied from the overall control unit 510 to the respective components as appropriate. The communication unit 520 may include a router apparatus for performing communication between the server apparatus 500 and a plurality of components. The communication unit 520 may include a plurality of different types of communication means for the respective components in order to perform communication between the server apparatus 500 and the plurality of components. The communication unit 520 may be connected to each component through an intranet line or an Internet line so that it can communicate with each component.

Next, control performed by the autonomous moving apparatus control system 10 will be described with reference to FIGS. 4 to 8 together with a specific example thereof. In the specific example described below, the mobile robot 100 moves to a different floor by using an elevator.

FIGS. 4 to 7 are diagrams showing the inside of the building 900 for showing a specific example of operations performed by the autonomous moving apparatus control system. The three-story building 900 includes an elevator 400. The elevator 400 is configured so that its cage 410 can stop on each of the first, second and third floors. The cage 410 is equipped with a distance detection apparatus 200 and an elevator operation apparatus 420. A server apparatus 500 is installed on the third floor.

There is an elevator hall 910A on the first floor of the building 900. Further, a floor door 931A that is opened when a person or an object gets on or off the cage 410 is provided in the elevator hall 910A. Further, a reflection plate 300A is provided near the floor door 931A. Similarly to the first floor, an elevator hall 910B, a floor door 931B, and a reflection plate 300B are provided on the second floor of the building 900. Similarly, an elevator hall 910C, a floor door 931C, and a reflection plate 300C are provided on the third floor.

The specific example shown here shows a case where the mobile robot 100 starts from a start place 900S on the first floor and moves to a goal place (i.e., a destination) 900G on the third floor. Further, on the second floor, a human being H who is going to move to the third floor by using the elevator 400 is waiting for the cage 410.

Figure 4:
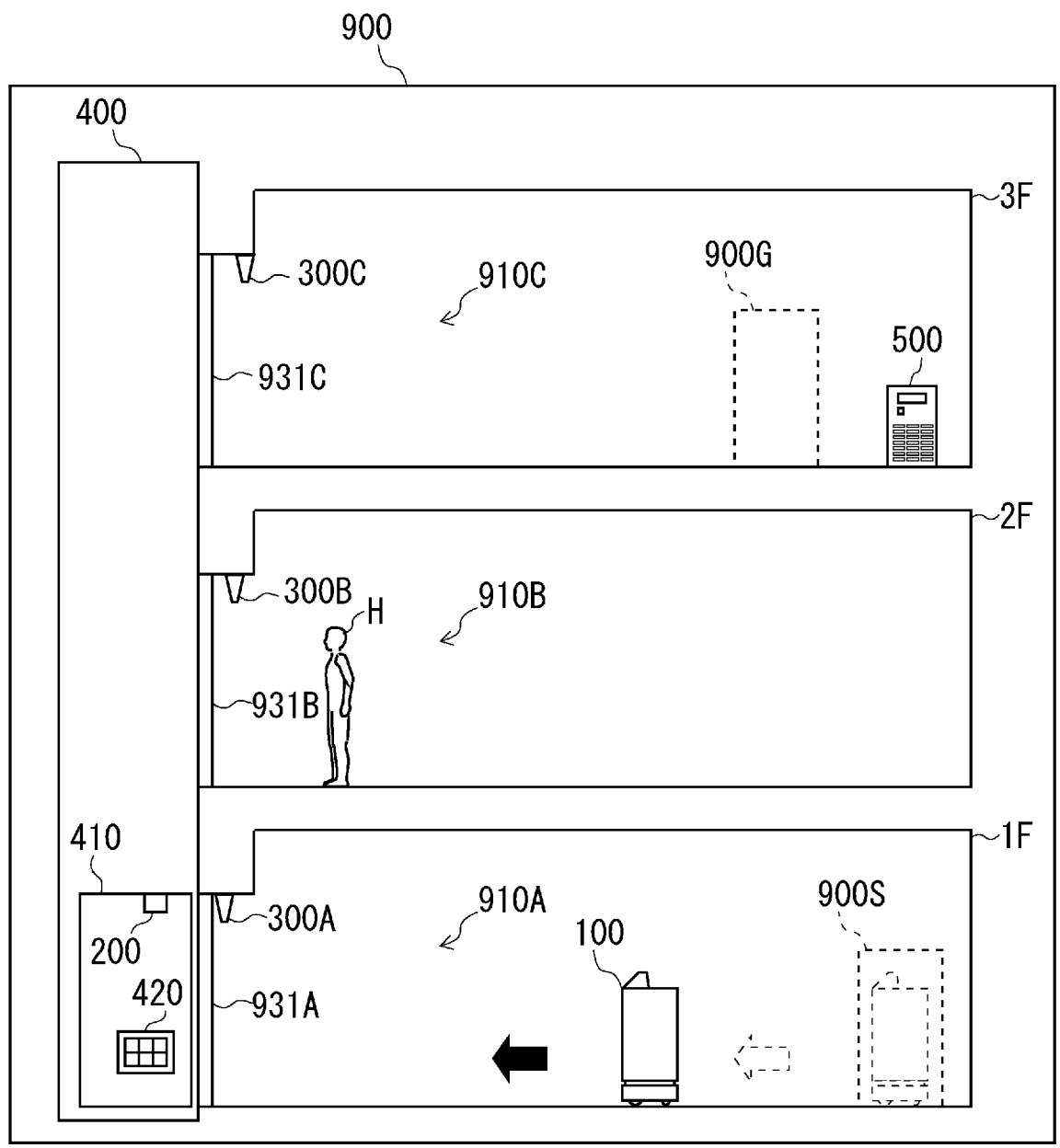
FIG. 4 is a first diagram showing an example of an operation performed by an autonomous moving apparatus control system.

FIG. 4 is a first diagram showing an example of an operation performed by the autonomous moving apparatus control system. FIG. 4 shows a state where the mobile robot 100 has started from the start place 900S and is moving toward the elevator 400. It is in a state where by an operation on the elevator operation apparatus 420, the cage 410 of the elevator 400 has moved from an upper floor to the first floor and it is waiting for the mobile robot 100 to get thereon.

In such a situation, the distance detection apparatus 200 detects that the floor door 931A is opened. Subsequently, the distance detection apparatus 200 receives reflected light from the reflection plate 300A disposed near the floor door 931A and detects (i.e., measures) a distance to the reflection plate 300A. Upon detecting the distance to the reflection plate 300A, the distance detection apparatus 200 transmits a signal relating to the detected distance to the server apparatus 500.

The server apparatus 500 detects that the cage 410 is in the opened-door state on the first floor based on the signal received from the distance detection apparatus 200. The server apparatus 500 transmits a signal indicating that the mobile robot 100 can get on the elevator 400 to the mobile robot 100. Upon receiving the signal indicating that it can get on the elevator 400 from the server apparatus 500, the mobile robot 100 gets on the cage 410.

Figure 5:
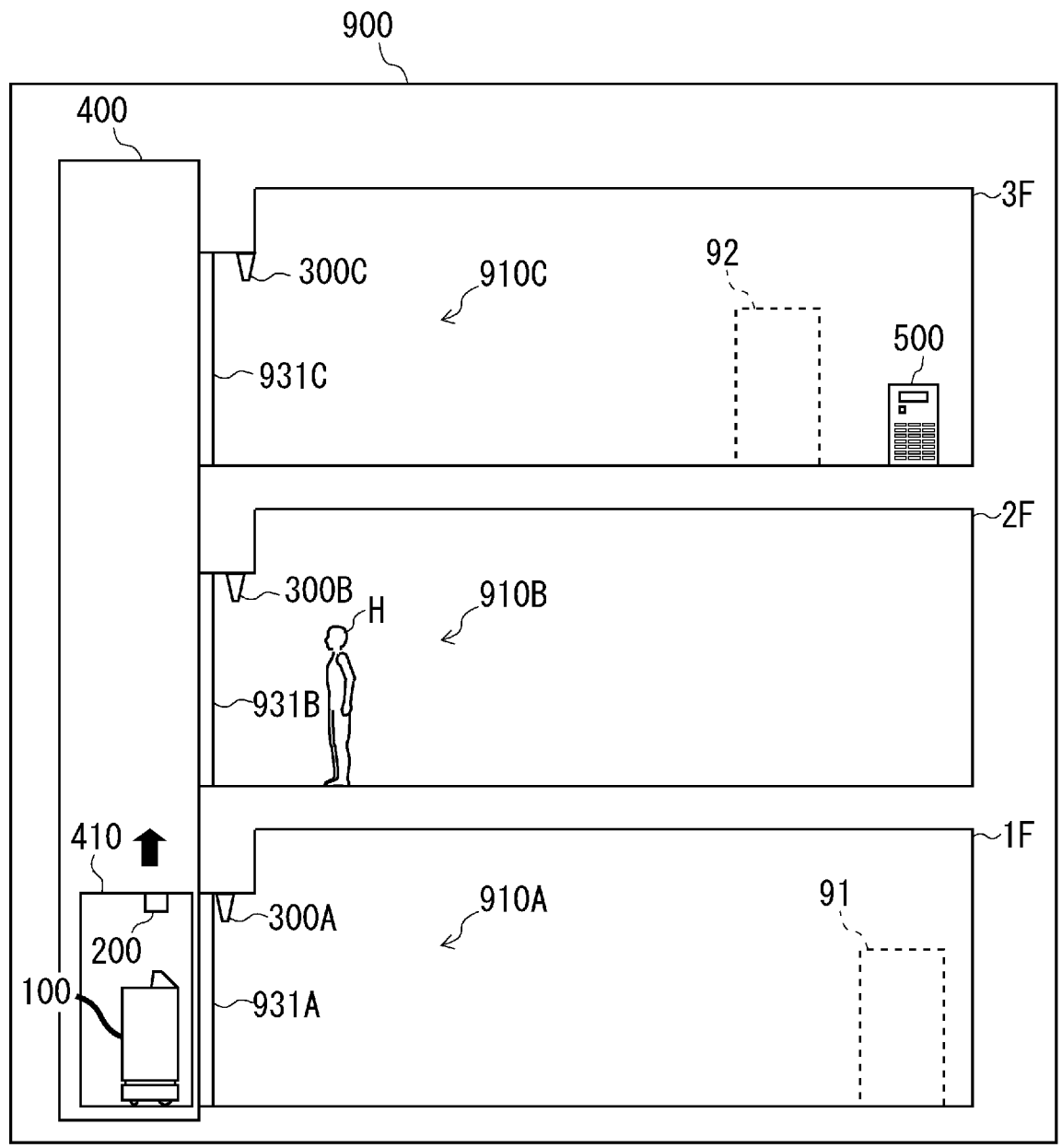
FIG. 5 is a second diagram showing an example of an operation performed by an autonomous moving apparatus control system.

FIG. 5 is a second diagram showing an example of an operation performed by the autonomous moving apparatus control system. FIG. 5 shows a state in which the mobile robot 100 has just gotten on the cage 410. Upon completing the operation for getting on the cage 410, the mobile robot 100 transmits a signal indicating that it has completed the getting-on operation to the server apparatus 500. Upon receiving the signal indicating the completion of the operation from the mobile robot 100, the server apparatus 500 instructs the elevator operation apparatus 420 to press a button for the third floor on which the goal place 900G is located. When the button for the third floor, which is the destination, is pressed, the elevator 400 closes the floor door 931 and starts moving upward.

Figure 6:
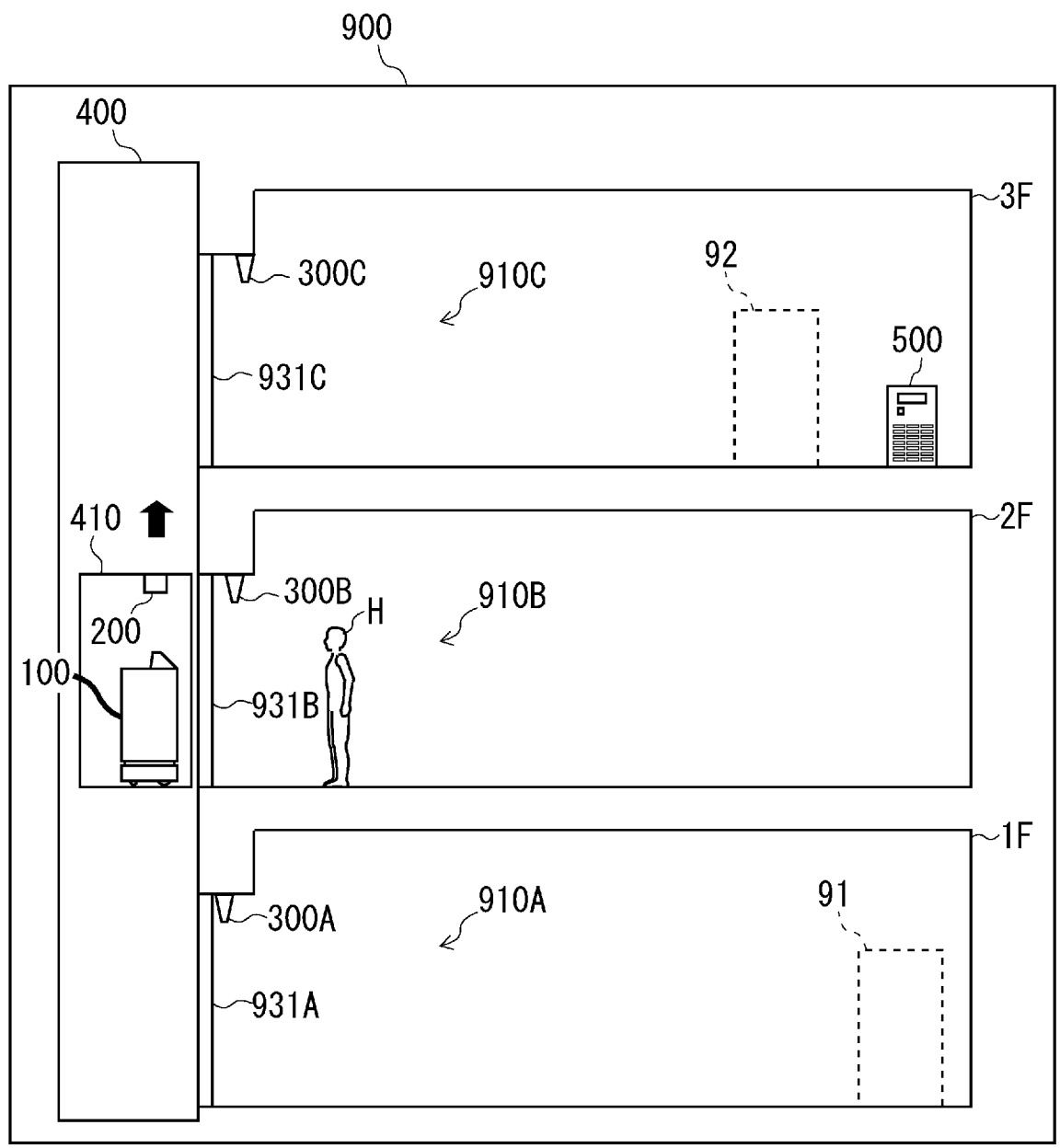
FIG. 6 is a third diagram showing an example of an operation performed by an autonomous moving apparatus control system.

FIG. 6 is a third diagram showing an example of an operation performed by the autonomous moving apparatus control system. FIG. 6 shows a state in which the cage 410 has stopped on the second floor. As the human being H performs an operation for enabling him/her to get on the cage 410, which is moving upward, the cage 410 stops on the second floor and opens the floor door 931B. In the specific example shown here, the human being H refrains from getting on the cage 410 because the mobile robot 100 has already been in the cage 410.

At this point, after detecting that the cage 410 becomes the opened-door state, the distance detection apparatus 200 detects (i.e., measures) a distance to the reflection plate 300B. Upon detecting the distance to the reflection plate 300B, the distance detection apparatus 200 transmits the detected signal to the server apparatus 500.

The server apparatus 500 detects that the cage 410 is in the opened-door state on the second floor based on the signal received from the distance detection apparatus 200. Note that the floor on which the mobile robot 100 is going to get off the elevator is the third floor. Therefore, the server apparatus 500 does not transmit a signal indicating that the mobile robot 100 can get off the elevator 400 to the mobile robot 100. Since the mobile robot 100 receives no instruction indicating that it can get off the elevator 400, it does not perform an operation for getting off the cage 410 on this floor. Then, the elevator 400 closes the floor door 931B and starts moving upward to the third floor.

Figure 7:
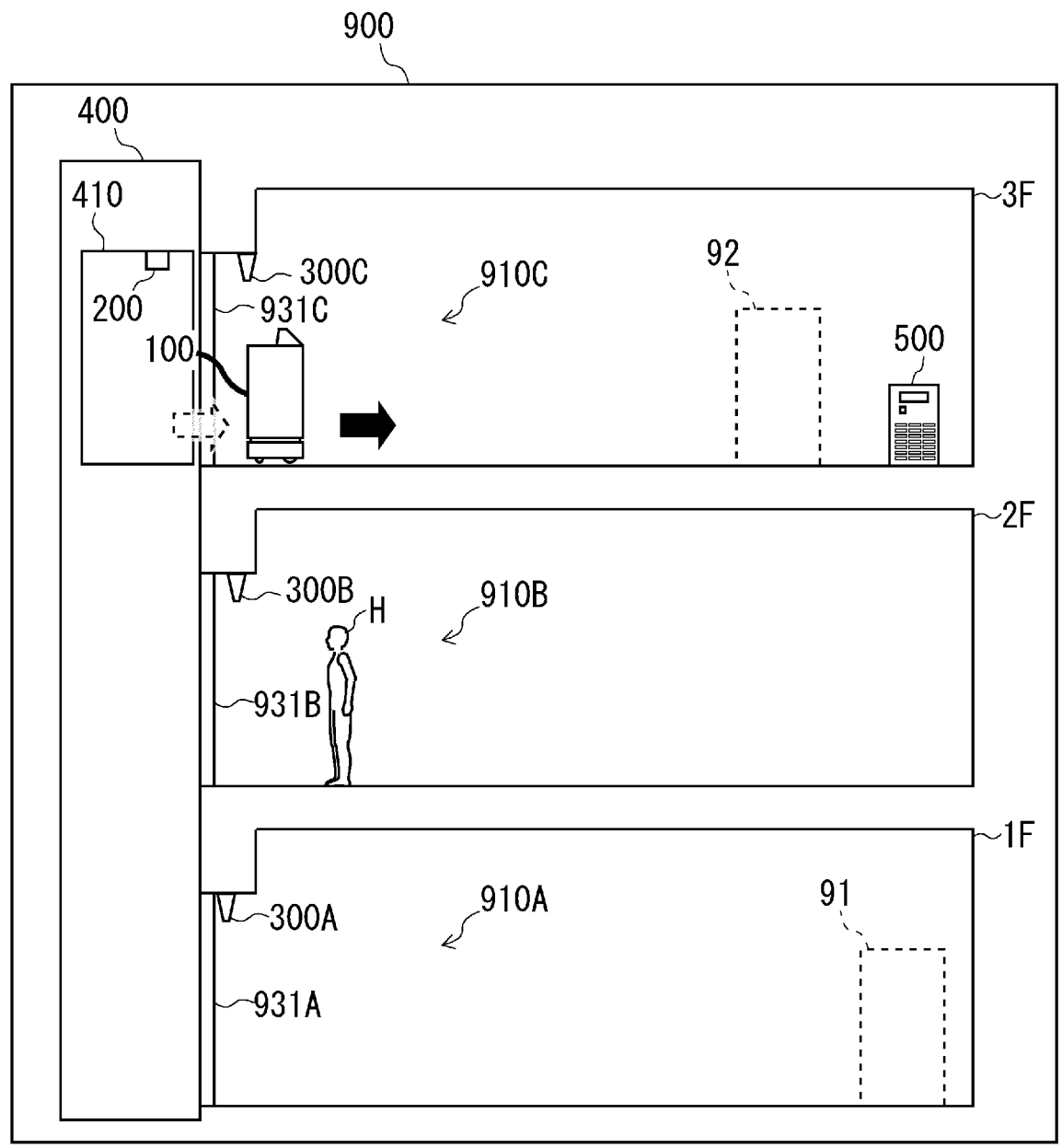
FIG. 7 is a fourth diagram showing an example of an operation performed by an autonomous moving apparatus control system.

FIG. 7 is a fourth diagram showing an example of an operation performed by the autonomous moving apparatus control system. FIG. 7 shows state in which the cage 410 has stopped on the third floor. When the cage 410 stops on the third floor, the elevator 400 opens the floor door 931C.

After detecting that the cage 410 becomes the opened-door state, the distance detection apparatus 200 detects (i.e., measures) a distance to the reflection plate 300C. Upon detecting the distance to the reflection plate 300C, the distance detection apparatus 200 transmits the detected signal to the server apparatus 500.

The server apparatus 500 detects that the cage 410 is in the opened-door state on the third floor based on the signal received from the distance detection apparatus 200. The server apparatus 500 transmits a signal indicating that the mobile robot 100 can get off the elevator 400 to the mobile robot 100.

Upon receiving the instruction indicating that the mobile robot 100 can get off the elevator 400, it starts an operation for getting off the cage 410. The mobile robot 100 moves to the goal place 900G while referring to information about a floor map possessed by the mobile robot 100 itself.

The control performed by the autonomous moving apparatus control system 10 has been described above together with the specific example. Note that the server apparatus 500 may transmit floor information including information about the floor on which the cage 410 is stopped in addition to the information as to whether or not the mobile robot 100 can get on or off the elevator 400.

Figure 8:
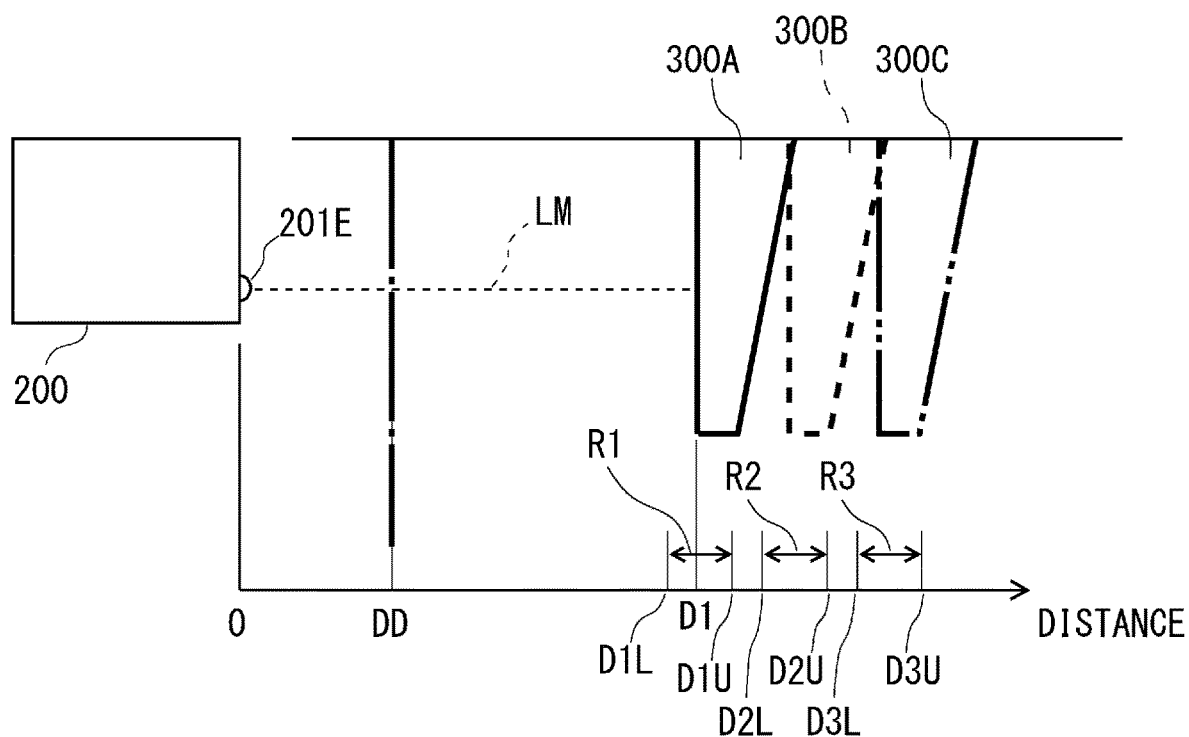
FIG. 8 shows a relation between a range sensor and reflection plates according to the first embodiment.

Next, a relation between the distance detection apparatus 200 and the reflection plates 300A to 300 C used in the above-described specific example will be described. FIG. 8 shows a relation between the range sensor and the reflection plates according to the first embodiment. FIG. 8 schematically shows the distance detection apparatus 200 disposed in the cage 410 and the reflection plates 300A to 300C disposed on the respective floors in a superimposed manner in order to show their positional relation.

The range sensor 201 included in the distance detection apparatus 200 shown in FIG. 8 includes a light emitting part 201E that emits signal light LM. The range sensor 201 emits the signal light LM from the light emitting part 201E to the reflection plates 300A to 300C. The reflection plates 300A to 300C are shown in a superimposed manner on the right side of the distance detection apparatus 200. The reflection plate 300A disposed on the first floor of the building 900 is located in a place that is closest to the distance detection apparatus 200 and on the leftmost side among the three reflection plates. The surface on the left side of the reflection plate 300A is a reflection surface that reflects the signal light LM emitted from the distance detection apparatus 200. The distance detection apparatus 200 detects (i.e., measures) a distance to the reflection plate 300A by detecting (i.e., measuring) a distance to its reflection surface. Note that in the present disclosure, the signal light shown in the figure is schematically shown by a straight line. That is, it does not mean that the signal light is parallel light. The signal light may be parallel light or diffuse light.

The reflection plate 300B disposed on the second floor is indicated by a broken line in this example. The reflection plate 300B is located on the right side of the reflection plate 300A. The reflection plate 300C disposed on the third floor is indicated by a two-dot chain line in this example. The reflection plate 300C is located on the right side of the reflection plate 300B. In this embodiment, while the reflection plates 300A to 300C are disposed in different positions, they have the same shape as each other.

In a lower part of FIG. 8, distances from the distance detection apparatus 200 (the range sensor 201) are shown. A line extending below the light emitting part 201E in the lower part of FIG. 8 indicates a position where the distance is zero. In this embodiment, the distance D1L is defined as a lower limit value of the distance between the distance detection apparatus 200 and the reflection plate 300A. Similarly, the distance D1U is defined as an upper limit value of the distance between the distance detection apparatus 200 and the reflection plate 300A. Note that a range between the distance D1L, which is the lower limit value, and the distance D1U, which is the upper limit value, is referred to as a target range R1. The reflection plate 300A is disposed so that the distance from the distance detection apparatus 200 falls within the target range R1.

Similarly, in the reflection plate 300B disposed on the second floor, a range between a lower limit value D2L, which is further from the distance detection apparatus 200 than the distance D1U is, and a distance D2U, which is an upper limit value, is defined as a target range R2. Further, in the reflection plate 300C disposed on the third floor, a range between a lower limit value D3L, which is further from the distance detection apparatus 200 than the distance D2U is, and a distance D3U, which is an upper limit value, is defined as a target range R3.

In the example shown in FIG. 2, a distance from the distance detection apparatus 200 to the reflection surface on the left side of the reflection plate 300A is indicated as a distance D1. As shown in the figure, the distance D1 is within the target range R1. When the distance D1 is within the target range R1, the overall control unit 510 detects (i.e., determines) that the cage 410 is stopped on the first floor. As described above, in the autonomous moving apparatus control system 10, the overall control unit 510 determines that the mobile robot 100 can get on or off the elevator when the distance detected on the elevator-stop floor is within the respective one of the target ranges which are defined for the respective elevator-stop floors on which the mobile robot 100 gets on and off the elevator.

Note that in FIG. 8, a one-dot chain line extending in the vertical direction between the distance detection apparatus 200 and the reflection plate 300A indicates a surface of the cage door 411 that faces the distance detection apparatus 200. In FIG. 8, a distance from the distance detection apparatus 200 to the cage door 411 is indicated as a distance DD. When the signal received from the distance detection apparatus 200 indicates the distance DD, the overall control unit 510 detects (i.e., determines) that the elevator 400 is in a closed-door state. In this way, the autonomous moving apparatus control system 10 can make setting so that when the elevator 400 is in the closed-door state, the mobile robot 100 does not determine that it can get on or off the elevator 400.

Further, the overall control unit 510 may determine whether or not the mobile robot 100 can get on or off the elevator according to the timing at which the signal transmitted from the distance detection apparatus 200 changes. In this case, for example, when a signal indicating the distance DD indicating an unopened-door state changes to a signal indicating the distance D1 indicating an unclosed-door state, the overall control unit 510 determines that the mobile robot 100 can get on or off the elevator 400 after a certain period has elapsed from the timing at which the signal changed. For example, the overall control unit 510 does not determine that the mobile robot 100 can get on or off the elevator 400 until a predetermined period elapses after the signal indicating the distance DD indicating the unopened-door state changes to the signal indicating the distance D1. By making the setting as described above, the mobile robot 100 can perform a getting on/off operation after the elevator door 940 is completely opened. In this way, the autonomous moving apparatus control system 10 can determine a safe getting on/off state according to the speed of the opening/closing operation of the elevator door 940.

The first embodiment has been described above. The autonomous moving apparatus control system 10 according to the first embodiment is formed by a combination of apparatuses that can be easily added to the building 900 and the elevator 400. Therefore, the autonomous moving apparatus control system 10 can be applied to existing facilities and the like. That is, according to the first embodiment, it is possible to provide an autonomous moving apparatus control system that can be easily installed in order to enable an autonomous moving apparatus to use an elevator.

Modified Example of First Embodiment

Figure 9:
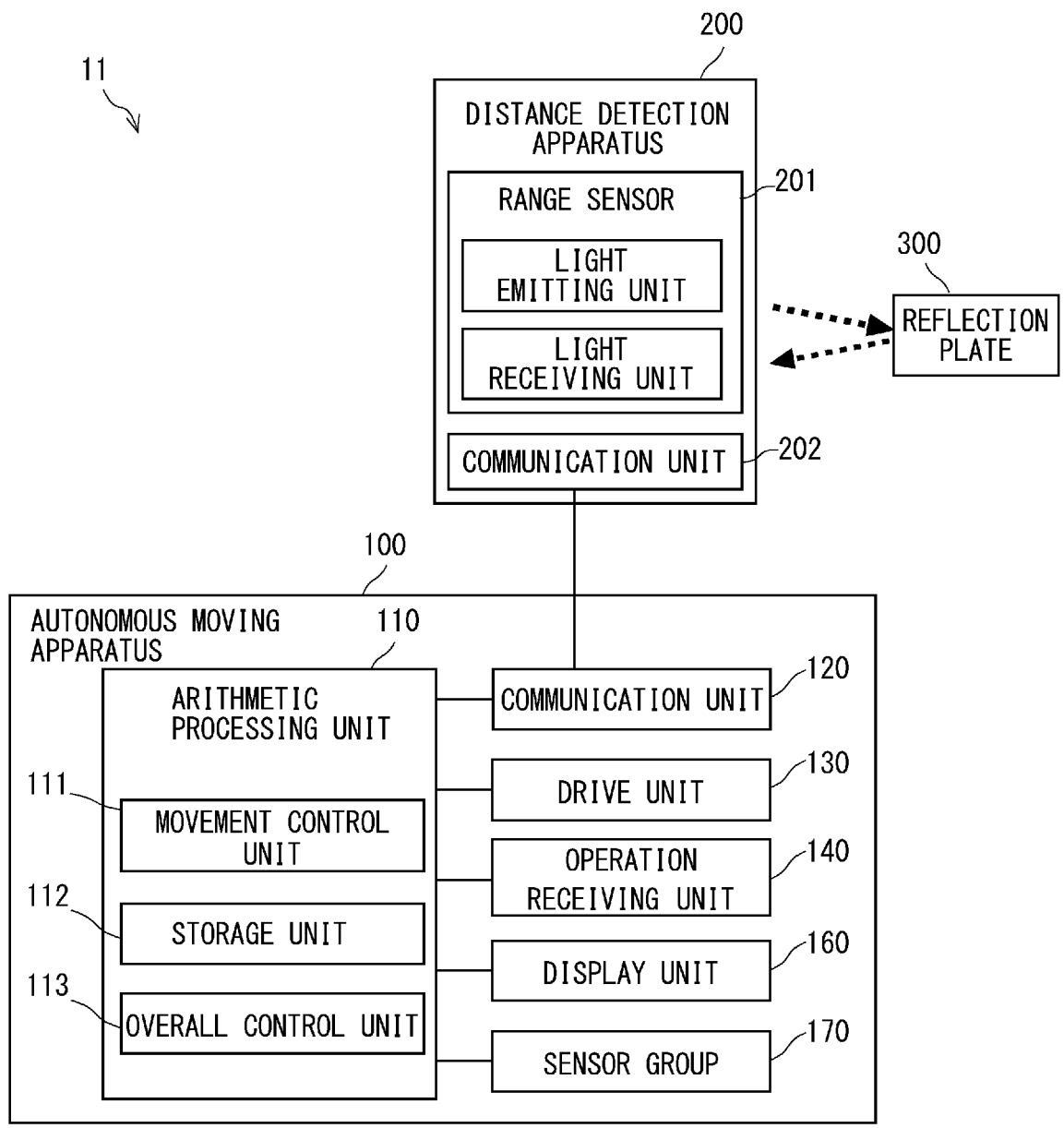
FIG. 9 is a block diagram of an autonomous moving apparatus control system according to a modified example of the first embodiment.

Next, a modified example of the first embodiment will be described with reference to FIG. 9. In the modified example of the first embodiment, the mobile robot 100 performs a function that is performed by the server apparatus 500 in the above-described first embodiment. FIG. 9 is a block diagram of an autonomous moving apparatus control system 11 according to the modified example of the first embodiment. The autonomous moving apparatus control system 11 shown in FIG. 9 includes a mobile robot 100, a distance detection apparatus 200, and a reflection plate 300. An arithmetic processing unit 110 of the mobile robot 100 includes an overall control unit 113. Further, the mobile robot 100 can directly communicate with the distance detection apparatus 200.

The overall control unit 113 receives a signal relating to a distance, which is transmitted from the distance detection apparatus 200, through a communication unit 120 and determines whether or not the mobile robot 100 itself can get on or off the elevator 400 according to the received signal.

As described above, the autonomous moving apparatus control system 11 according to the modified example of the first embodiment can be easily applied to existing facilities and the like without the server apparatus interposed therebetween. Therefore, according to the modified example of the first embodiment, it is possible to provide an autonomous moving apparatus control system that can be easily installed in order to enable an autonomous moving apparatus to use an elevator.

Second Embodiment

Next, a second embodiment will be described. The second embodiment is different from the first embodiment because the second embodiment has a function of detecting a level difference between the elevator hall and the elevator cage. When the elevator cage stops on a certain floor, its stop position may vary. When the stop position of the cage varies and hence there is a large level difference, the autonomous moving apparatus may receive an undesired impact during the getting on/off operation or the getting on/off operation itself may not be smoothly performed. Therefore, the autonomous moving apparatus control system according to the second embodiment determines whether or not the level difference is small enough to allow the autonomous moving apparatus can get on or off the elevator based on a signal detected by a range sensor provided in the distance detection apparatus.

Figure 10:
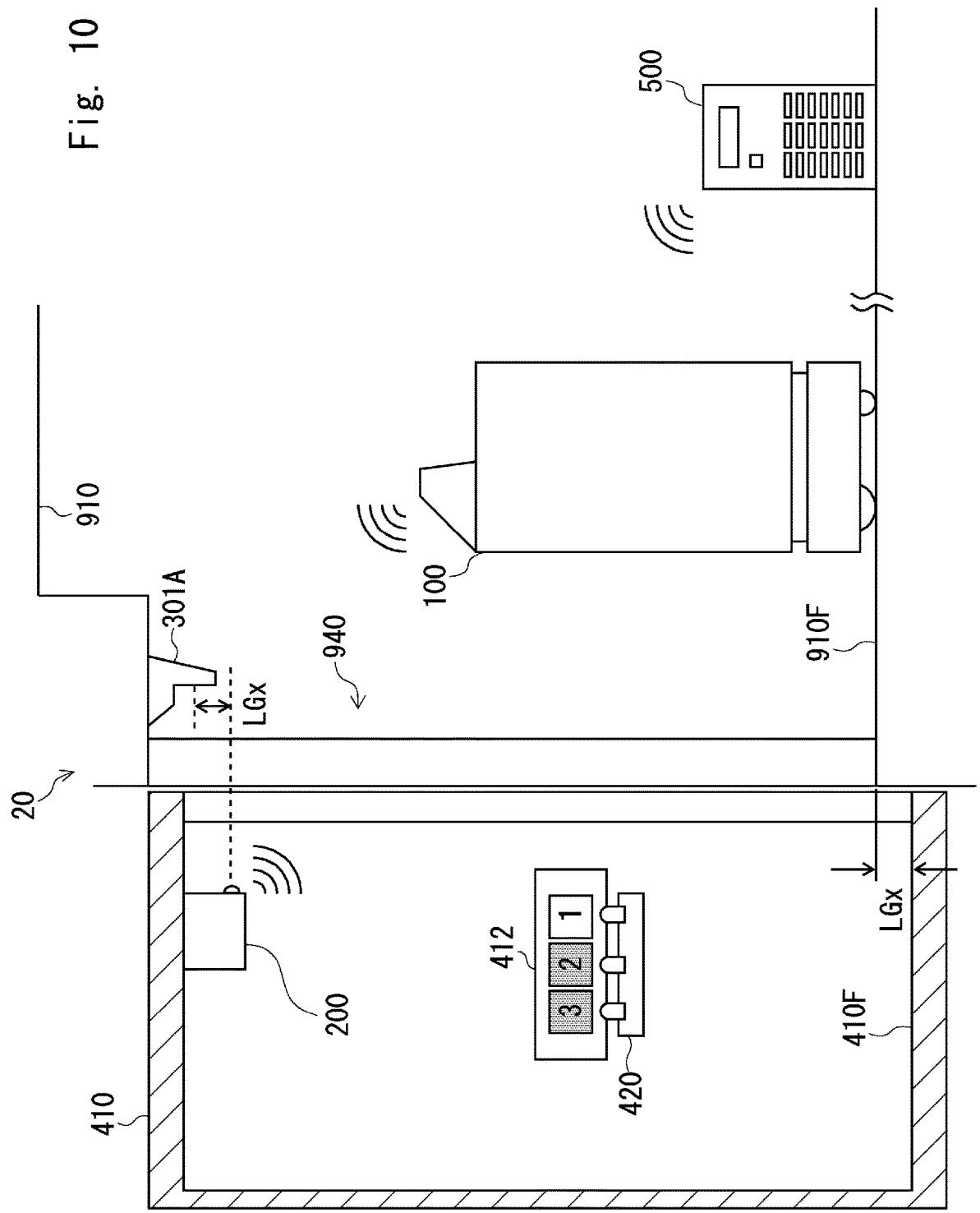
FIG. 10 shows a first example of an autonomous moving apparatus control system according to a second embodiment.

FIG. 10 shows a first example of an autonomous moving apparatus control system 20 according to the second embodiment. FIG. 10 shows a situation where the mobile robot 100 present in the elevator hall 910 is about to move to another floor by using the elevator 400. FIG. 10 shows a case where the cage 410 stops relatively below the elevator hall 910 in the above-described situation. In the example shown in FIG. 10, there is a level difference LGx between the floor surface 910F of the elevator hall 910 and the floor surface 410F of the cage 410.

Figure 11:
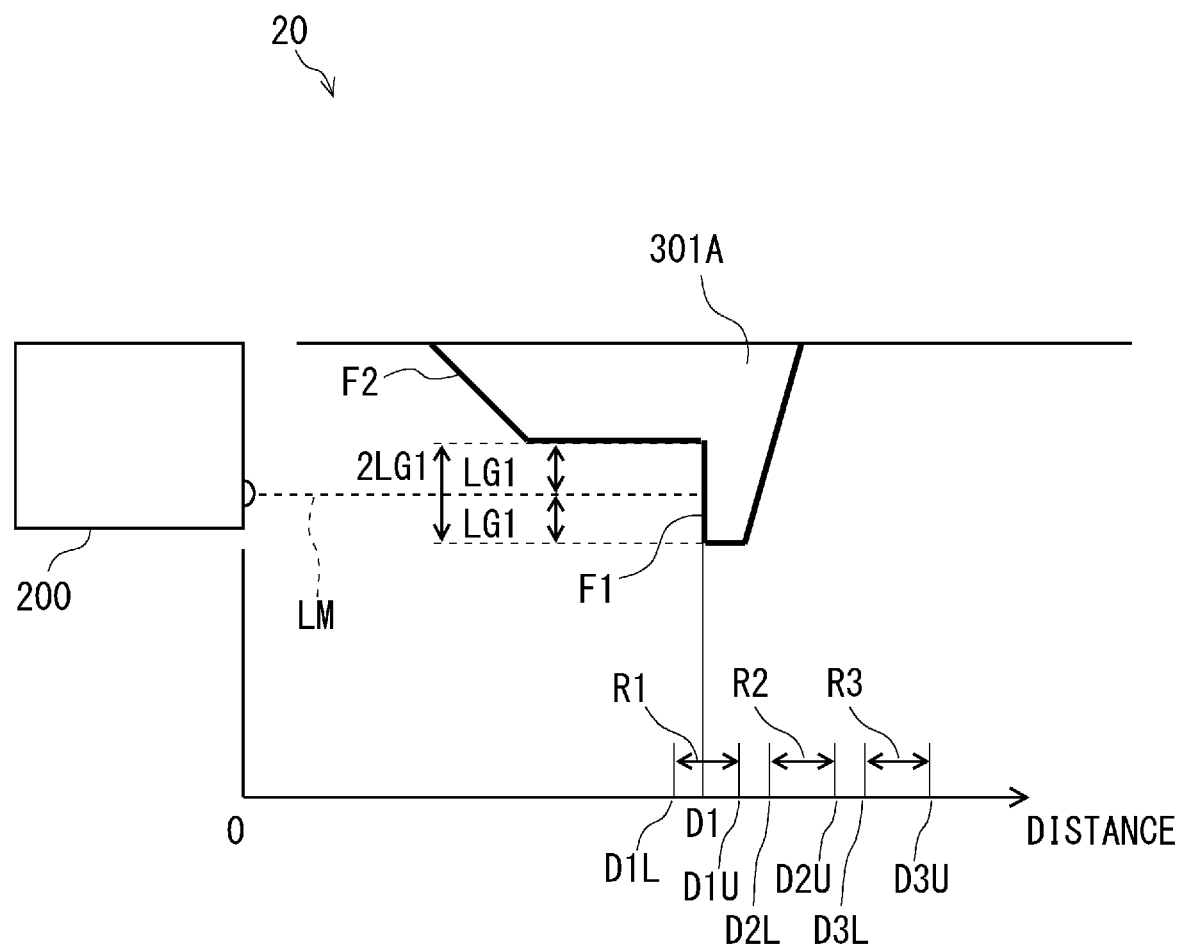
FIG. 11 shows a reflection plate according to the second embodiment.

Details of a reflection plate according to the second embodiment will be described with reference to FIG. 11. FIG. 11 shows a reflection plate in the autonomous moving apparatus control system 20 according to the second embodiment. Regarding the reflection plate 302A shown in FIG. 11, the length of the surface extending in the vertical direction is set according to the length of the level difference between the floor surface of the cage 410 and the floor surface of the elevator hall 910 at the stop position of the cage 410 on each floor.

The reflection plate 301A includes a reflection surface F1 and a non-reflection surface F2 on the side thereof opposed to the distance detection apparatus 200. The reflection surface F1 faces the distance detection apparatus 200 and is configured so as to be able to reflect signal light. The non-reflection surface F2 extends downward from the ceiling surface of the elevator hall 910 and supports the reflection surface F1.

The reflection surface F1 is configured so as to be positioned within the target range R1. Further, the reflection surface F1 has a length 2LG1 that is twice a length LG1 in the vertical direction. The length LG1 is equal to the upper limit value of the length of the level difference that the mobile robot 100 can pass through (e.g., get over). The reflection surface F1 is configured so that the signal light LM is incident on a center part thereof in the vertical direction when there is no level difference between the floor surface of the cage 410 and the floor surface of the elevator hall 910. That is, when the cage 410 is stopped relatively above or below the elevator hall 910 and the level difference exceeds the height LG1, the signal light LM is not incident on the reflection surface F1 of the reflection plate 301A.

In the example shown in FIG. 10, the signal light LM emitted from the distance detection apparatus 200 is deviated downward from the central part of the reflection surface F1 by the distance LGx. In such a situation, the distance detection apparatus 200 does not detect the reflection plate 301A disposed in the target range R1 by the signal light that is emitted after the elevator door 940 is opened. Since the distance detection apparatus 200 does not detect the reflection plate 301A, the overall control unit 510 of the server apparatus 500 does not determine that the mobile robot 100 can get on or off the cage 410. Therefore, the mobile robot 100 does not start an operation for getting on the cage 410, which is in the opened-door state.

Figure 12:
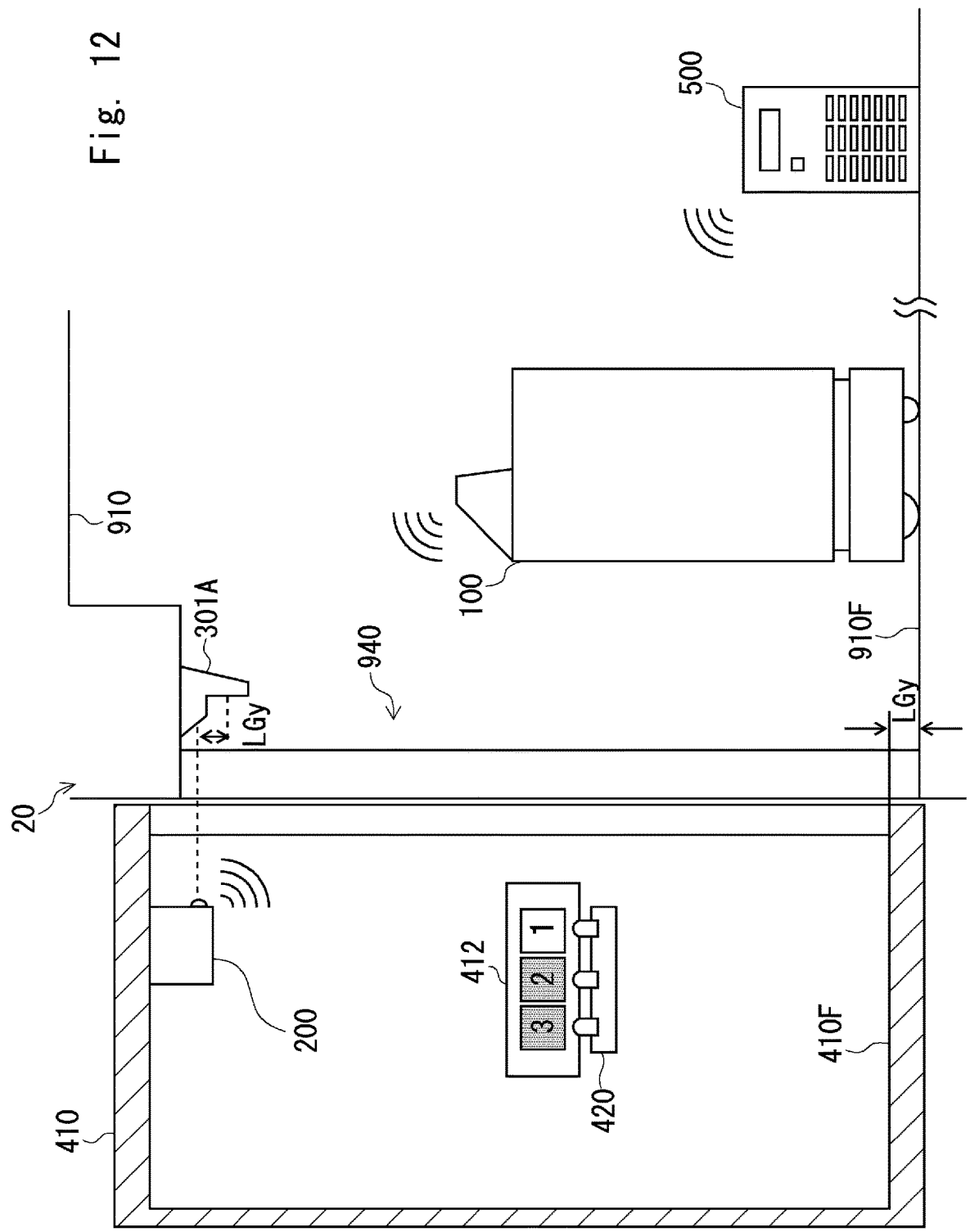
FIG. 12 shows a second example of an autonomous moving apparatus control system according to the second embodiment.

FIG. 12 shows a second example of the autonomous moving apparatus control system 20 according to the second embodiment. FIG. 12 shows a situation where the cage 410 stops relatively above the elevator hall 910. In the example shown in FIG. 12, there is a level difference LGy, which is longer than the length LG1, between the floor surface 910F of the elevator hall 910 and the floor surface 410F of the cage 410. In this case, the signal light LM is applied to the non-reflection surface F2 located above the reflection surface F1. Therefore, the distance detection apparatus 200 does not detect the reflection surface F1 of the reflection plate 301A.

The non-reflection surface F2 is subjected to a predetermined process in advance so that the autonomous moving apparatus control system 20 does not malfunction in the above-described situation. The predetermined process is, for example, a process for applying a coating for reducing the reflection of signal light or a process for configuring so that the distance between the distance detection apparatus 200 and the non-reflection surface F2 does not fall within any of the target ranges R1 to R3. In this way, the distance detection apparatus 200 detects no object in the target range R1. Therefore, the overall control unit 510 of the server apparatus 500 does not determine that the mobile robot 100 can get on or off the cage 410. Accordingly, the mobile robot 100 does not start an operation for getting on the cage 410, which is in the opened-door state.

As described above, the length of the reflection surface F1 in the vertical direction is set according to the length of the level difference between the floor surface 410F and the floor surface 910F of the elevator hall 910 at the stop position of the cage 410. In this way, the autonomous moving apparatus control system 20 detects (i.e., determines) whether or not the level difference, which is caused because the stop position of the cage 410 varies, is within a permissible range for the mobile robot 100. Then, the autonomous moving apparatus control system 20 determines that the mobile robot 100 can get on or off the elevator 400 when the level difference is within the range in which the mobile robot 100 can pass through (e.g., gets over) the level difference. In other words, the autonomous moving apparatus control system 20 does not determine that the mobile robot 100 can get on or off the elevator 400 when the level difference is outside the range in which the mobile robot 100 can pass through the level difference.

The second embodiment has been described above. The autonomous moving apparatus control system 20 according to the second embodiment can detect a situation in which the mobile robot 100 can get on or off the elevator. Therefore, according to the second embodiment, it is possible to provide an autonomous moving apparatus control system that can be easily installed in order to enable an autonomous moving apparatus to use an elevator, and enables the autonomous moving apparatus to safely get on or off the elevator.

Third Embodiment

Next, a third embodiment will be described. As described above, when the cage of the elevator stops on a certain floor, its stop position may vary. Even if the stop position of the cage varies and hence there is a level difference between the floor surface of the cage and the floor surface of the elevator hall, the autonomous moving apparatus can get over and travel through the level difference as long as the level difference is within a permissible range for the autonomous moving apparatus (e.g., is equal to or shorter than a quarter of the diameter of the drive wheel or the caster). However, even when the autonomous moving apparatus can get over the level difference, there is a case where it is undesirable to let an object conveyed by the autonomous moving apparatus to receive an impact.

Therefore, an autonomous moving apparatus control system according to the third embodiment detects (i.e., measures) the length of the level difference based on a signal detected by a range sensor provided in the distance detection apparatus and determines whether or not the autonomous moving apparatus can get on or off the elevator according to the detected (i.e., measured) length of the level difference. More specifically, the third embodiment is different from the above-described embodiments because the reflection plate includes an inclined surface inclined with respect to the vertical direction.

Figure 13:
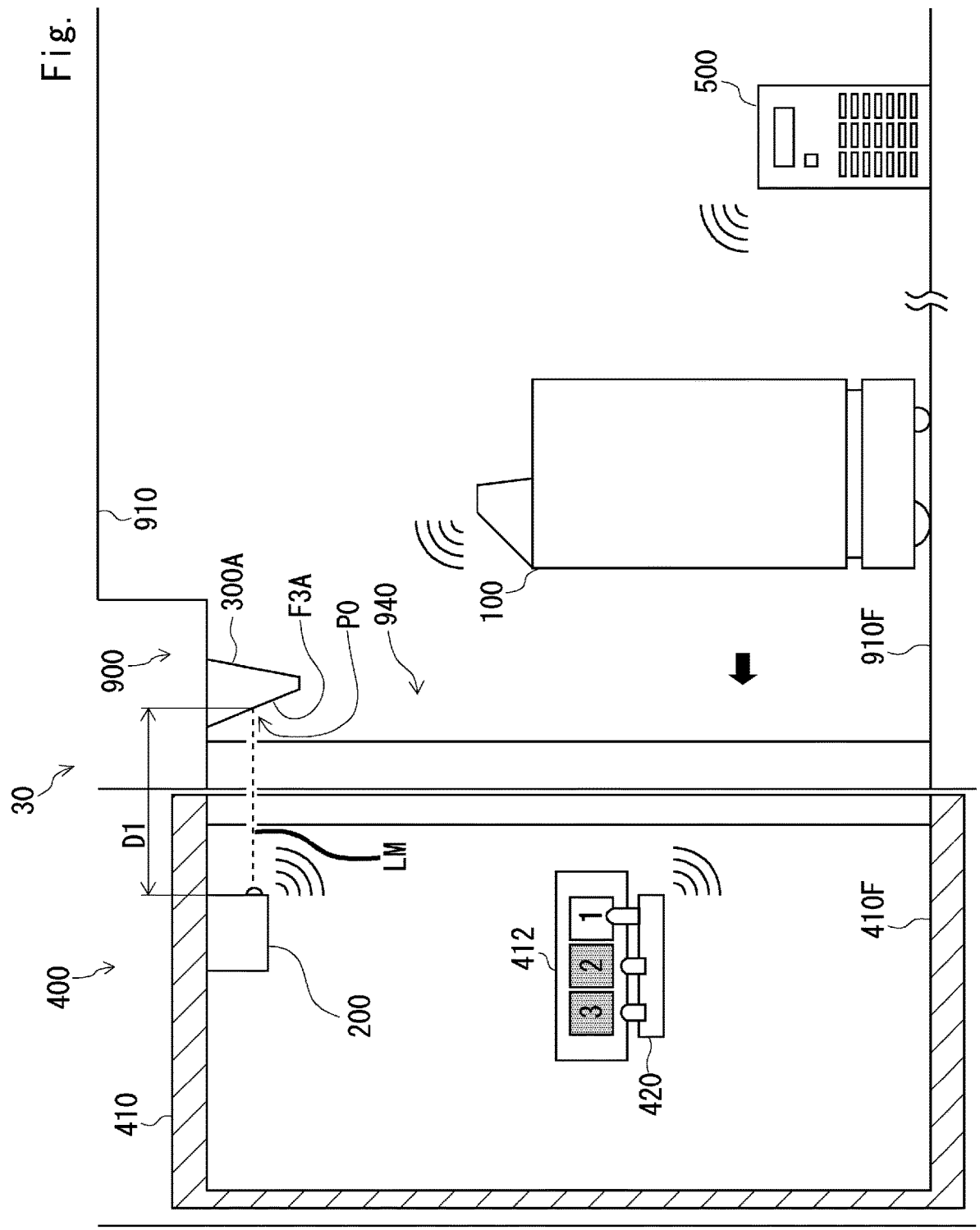
FIG. 13 shows a reflection plate according to a third embodiment.

FIG. 13 shows a reflection plate according to the third embodiment. FIG. 13 shows a distance detection apparatus 200 and a reflection plate 300A in an autonomous moving apparatus control system 30 according to the third embodiment. The reflection plate 300A includes a reflection surface F3A inclined with respect to the vertical direction. The reflection surface F3A is configured so that the distance between the reflection surface F3A and the distance detection apparatus 200 increases as the distance from the ceiling surface of the elevator hall 910 in the downward direction increases.

The reflection plate 300A shown in FIG. 13 is disposed in the elevator hall 910 on the first floor of the building 900. The distance detection apparatus 200 and the reflection plate 300A shown in FIG. 13 are in a state in which the level difference between the floor surface 410F of the cage 410 and the floor surface 910F of the elevator hall 910 is zero. Signal light LM emitted from the range sensor 201 provided in the distance detection apparatus 200 is incident on a central part P0 of the reflection surface F3A in the vertical direction. When a distance corresponding to the central part P0 of the reflection surface F3A is detected by the signal light LM, the distance between the distance detection apparatus 200 and the reflection plate 300A becomes a reference detection distance D1. That is, when the distance between the distance detection apparatus 200 and the reflection plate 300 is equal to the reference detection distance D1, the autonomous moving apparatus control system 30 detects (i.e., determines) that the cage 410 is stopped on the first floor and the level difference between the cage 410 and the floor surface 910F of the elevator hall 910 is zero.

Figure 14:
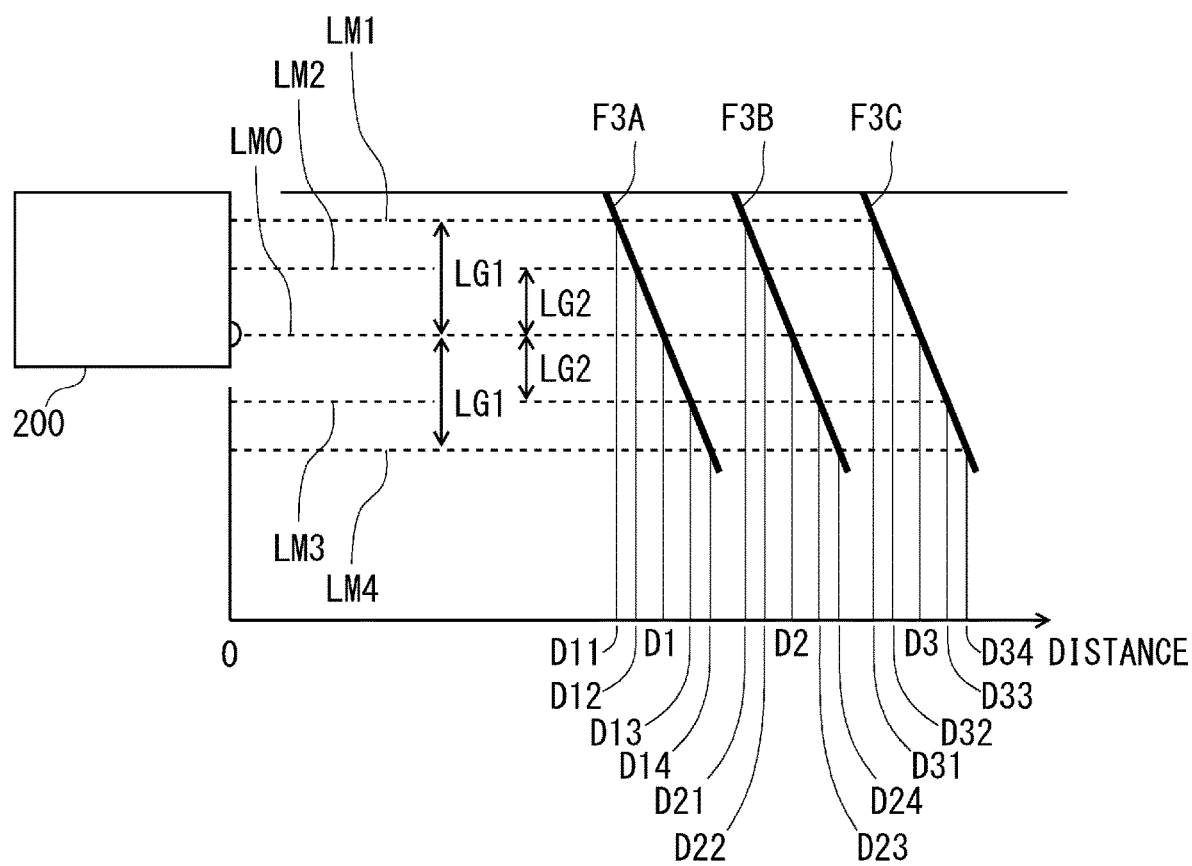
FIG. 14 shows a relation between a range sensor and a reflection plate according to the third embodiment.

Next, the relation between the range sensor and the reflection plate will be further described with reference to FIG. 14. FIG. 14 shows a relation between the range sensor and the reflection plate according to the third embodiment. FIG. 14 schematically shows the distance detection apparatus 200 disposed in the cage 410 and the reflection surfaces F3A to F3C of the reflection plates 300A to 300C, respectively, disposed on the respective floors in a superimposed manner in order to show their positional relation.

Note that the elevator hall 910 described in this embodiment collectively indicates the elevator hall 910A on the first floor, the elevator hall 910B on the second floor, and the elevator hall 910C on the third floor. Further, the heights of the reflection plates measured from the floor surfaces of the respective elevator holes 910A to 910C are equal to each other. Further, in the following description, the level difference between the floor surface 410F of the cage 410 and the floor surface 910F of the elevator hall 910 is also referred to as a "level difference between the cage 410 and the elevator hall 910" or simply referred to as a "level difference".

The positional relation between the distance detection apparatus 200 and the reflection surfaces F3A to F3C shown in FIG. 14 indicates a position in which the level difference between the cage 410 and the elevator hall 910 is zero. The distance between the distance detection apparatus 200 and the reflection surface F3A in this position is a reference detection distance D1. A dotted line extending in the horizontal direction from the light emitting part 201E of the distance detection apparatus 200 schematically indicates signal light LM0 that the distance detection apparatus 200 applies to the reflection surface F3A in the position where the level difference is zero. That is, when the distance to the reflection surface F3A detected by the distance detection apparatus 200 is equal to the reference detection distance D1, the level difference between the cage 410 and the elevator hall 910 is zero.

A dotted line extending in the horizontal direction above the signal light LM0 is signal light LM1. The signal light LM1 schematically indicates signal light that the distance detection apparatus 200 applies to the reflection surface F3A when the floor surface 410F of the cage 410 is higher than the floor surface 910F of the elevator hall 910 and the level difference therebetween is a level difference LG1. In the positional relation indicated by the signal light LM1, the distance between the distance detection apparatus 200 and the reflection surface F3A is a first distance D11. That is, when the distance to the reflection surface F3A detected (i.e., measured) by the distance detection apparatus 200 is equal to the first distance D11, the level difference between the cage 410 and the elevator hall 910 is the first level difference LG1.

A dotted line extending in the horizontal direction between the signal light LM1 and the signal light LM0 is signal light LM2. The signal light LM2 schematically indicates signal light that the distance detection apparatus 200 applies to the reflection surface F3A when the floor surface 410F of the cage 410 is higher than the floor surface 910F of the elevator hall 910 and the level difference therebetween is a second level difference LG2 shorter than the first level difference LG1. In the positional relation indicated by the signal light LM2, the distance between the distance detection apparatus 200 and the reflection surface F3A is a second distance D12. That is, when the distance to the reflection surface F3A detected (i.e., measured) by the distance detection apparatus 200 is equal to the second distance D12, the level difference between the cage 410 and the elevator hall 910 is the level difference LG2.

A dotted line extending in the horizontal direction below the signal light LM0 is signal light LM3. The signal light LM3 schematically indicates signal light that the distance detection apparatus 200 applies to the reflection surface F3A when the floor surface 410F of the cage 410 is lower than the floor surface 910F of the elevator hall 910 and the level difference therebetween is the second level difference LG2 shorter than the first level difference LG1. In the positional relation indicated by the signal light LM3, the distance between the distance detection apparatus 200 and the reflection surface F3A is a third distance D13. That is, when the distance to the reflection surface F3A detected (i.e., measured) by the distance detection apparatus 200 is equal to the third distance D13, the level difference between the cage 410 and the elevator hall 910 is the level difference LG2.

A dotted line extending in the horizontal direction below the signal light LM3 is signal light LM4. The signal light LM4 schematically indicates signal light that the distance detection apparatus 200 applies to the reflection surface F3A when the floor surface 410F of the cage 410 is lower than the floor surface 910F of the elevator hall 910 and the level difference therebetween is the first level difference LG1 longer than the second level difference LG2. In the positional relation indicated by the signal light LM4, the distance between the distance detection apparatus 200 and the reflection surface F3A is a fourth distance D14. That is, when the distance to the reflection surface F3A detected (i.e., measured) by the distance detection apparatus 200 is equal to the fourth distance D14, the level difference between the cage 410 and the elevator hall 910 is the level difference LG1.

The relation between the distance detection apparatus 200 and the reflection surface F3A shown in FIG. 14 is as described above. Note that, for example, the absolute value of the difference between the reference detection distance D1 and the first distance D11 is larger than the absolute value of the difference between the reference detection distance D1 and the second distance D12. Similarly, for example, the absolute value of the difference between the reference detection distance D1 and the fourth distance D14 is larger than the absolute value of the difference between the reference detection distance D1 and the third distance D13. That is, the reflection surface F3A is inclined with respect to the vertical direction, and is configured so that it is indicated that the longer the difference between the distance detected by the distance detection apparatus 200 and the reference detection distance is, the longer the level difference between the floor surface 410F of the cage 410 and the floor surface 910F of the elevator hall 910 is. Therefore, the autonomous moving apparatus control system 30 can determine whether or not the level difference is relatively large by calculating and comparing the difference between the actually detected distance and the reference detection distance D1.

The relation between the distance detection apparatus 200 and the reflection surface F3B is also set in the same manner as the above-described relation. However, for example, the distance to the reflection surface F3B detected by the distance detection apparatus 200 is set so that the detected distance does not overlap with the distance to the reflection surface F3A detected by the distance detection apparatus 200. More specifically, for example, when the floor surface 410F of the cage 410 is higher than the floor surface 910F of the elevator hall 910 and the level difference therebetween is the level difference LG1, the distance detection apparatus 200 detects a distance D21 to the reflection surface F3B by the signal light LM1. When the floor surface 410F of the cage 410 is lower than the floor surface 910F of the elevator hall 910 and the level difference therebetween is the level difference LG1, the distance detection apparatus 200 detects a distance D24 to the reflection surface F3B by the signal light LM4. Note that it is configured so that the first to fourth distances D11 to D14 that the distance detection apparatus 200 detects for the reflection surface F3A do not overlap with any of the distances D21 to D24 that the distance detection apparatus 200 detects for the reflection surface F3B. Similarly, it is configured so that the range of distances that the distance detection apparatus 200 detects for the reflection surface F3C do not overlap with any of the distances that the distance detection apparatus 200 detects for the other reflection surfaces.

The autonomous moving apparatus control system 30 can store in advance the relation between lengths of the level difference that the autonomous moving apparatus can travel through (e.g., get over) and distances that the distance detection apparatus 200 detects. Further, the autonomous moving apparatus control system 30 can determine, based on the relation between the length of the level difference that the autonomous moving apparatus can travel through and the distance that the distance detection apparatus 200 detects stored therein in advance, whether or not the autonomous moving apparatus can get on or off the elevator according to the detected distance.

For example, the autonomous moving apparatus control system 30 can define a safe getting on/off feasible range for the level difference that the autonomous moving apparatus can travel through (e.g., get over) according to the property of the object conveyed by the mobile robot 100. In this case, the safe getting on/off feasible range is equal to or shorter than the level difference LG2. Further, among the distances detected by the distance detection apparatus 200, the range corresponding to the safe getting on/off feasible range is a range between the second distance D2 and the third distance D3. That is, the autonomous moving apparatus control system 30 determines that the mobile robot 100 can get on or off the elevator when the distance between the distance detection apparatus 200 and the reflection surface F3A is no shorter than the second distance D12 and no longer than the third distance D13.

A range that is longer than the level difference LG2 and no longer than the level difference LG1 is a level difference that the mobile robot can travel through. However, in this embodiment, as described above, it is not determined that the mobile robot 100 can travel through the level difference because of the property of the object to be conveyed. Therefore, the autonomous moving apparatus control system 30 does not determine that the mobile robot 100 can get on or off the elevator when the distance between the distance detection apparatus 200 and the reflection surface F3A is shorter than the second distance D12 or longer than the fourth distance D14.

The third embodiment has been described above. The autonomous moving apparatus control system 30 can define a level difference that is small enough to allow the autonomous moving apparatus can get on or off the elevator based on the property of the object to be conveyed. Therefore, the autonomous moving apparatus control system 30 may be configured so that the level difference that is small enough to allow the autonomous moving apparatus can get on or off the elevator is re-defined according to the object to be conveyed and/or other circumstances. Further, the autonomous moving apparatus control system 30 may be configured so as to detect the distance to the reflection plate, calculate the length of the level difference according to the detected distance, and change the traveling speed at the time when the autonomous moving apparatus get on or off the elevator according to the calculated length of the level difference.

As described above, the autonomous moving apparatus control system 30 according to the third embodiment can detect (i.e., determine) a situation in which the mobile robot 100 can get on or off the elevator. Therefore, according to the third embodiment, it is possible to provide an autonomous moving apparatus control system that can be easily installed in order to enable an autonomous moving apparatus to use an elevator, and enables the autonomous moving apparatus to safely get on and off the elevator.

Note that the present disclosure is not limited to the above-described embodiments and they can be modified as desired without departing from the spirit and scope of the present disclosure.

(Supplementary Note)

An autonomous moving apparatus is a moving apparatus that moves on a floor by rotating a wheel provided on a lower surface thereof. The autonomous moving apparatus includes a storage cabinet for conveying a certain parcel inside a main body thereof, and a storage cabinet door for accessing the storage cabinet in a front of the main body.

Figure 15:
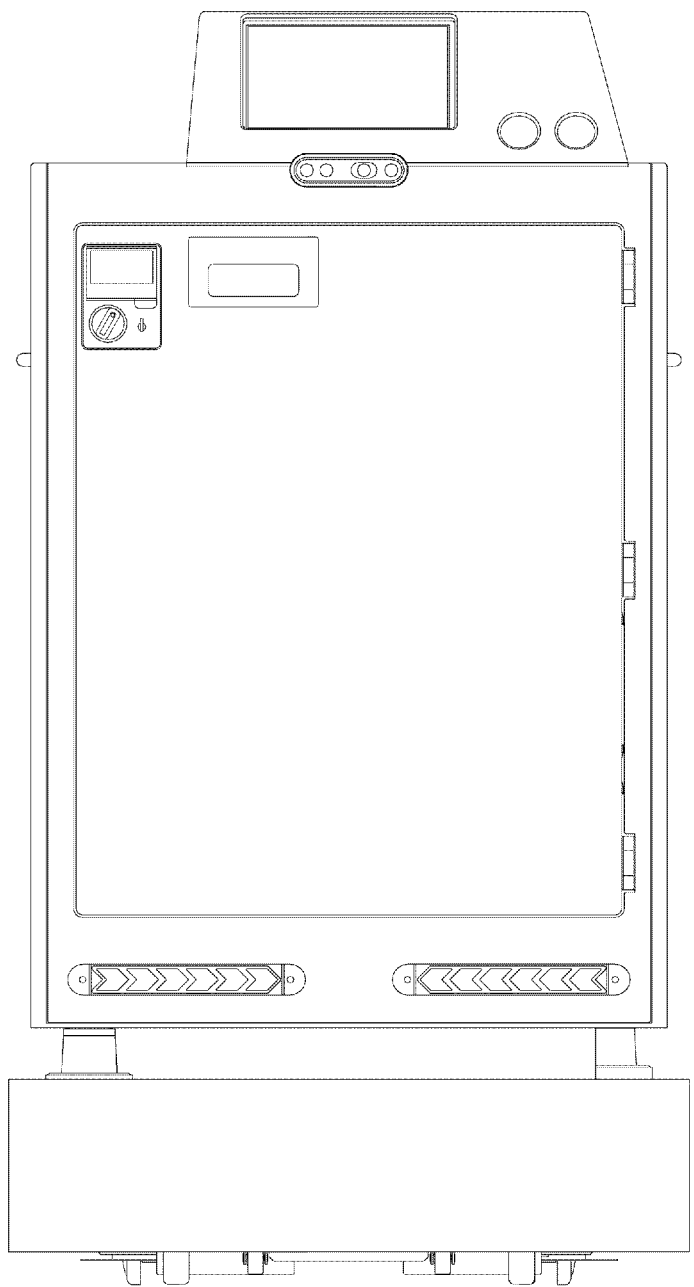
FIG. 15 is a front view of a mobile robot.

FIG. 15 is a front view of an autonomous moving apparatus.

Figure 16:
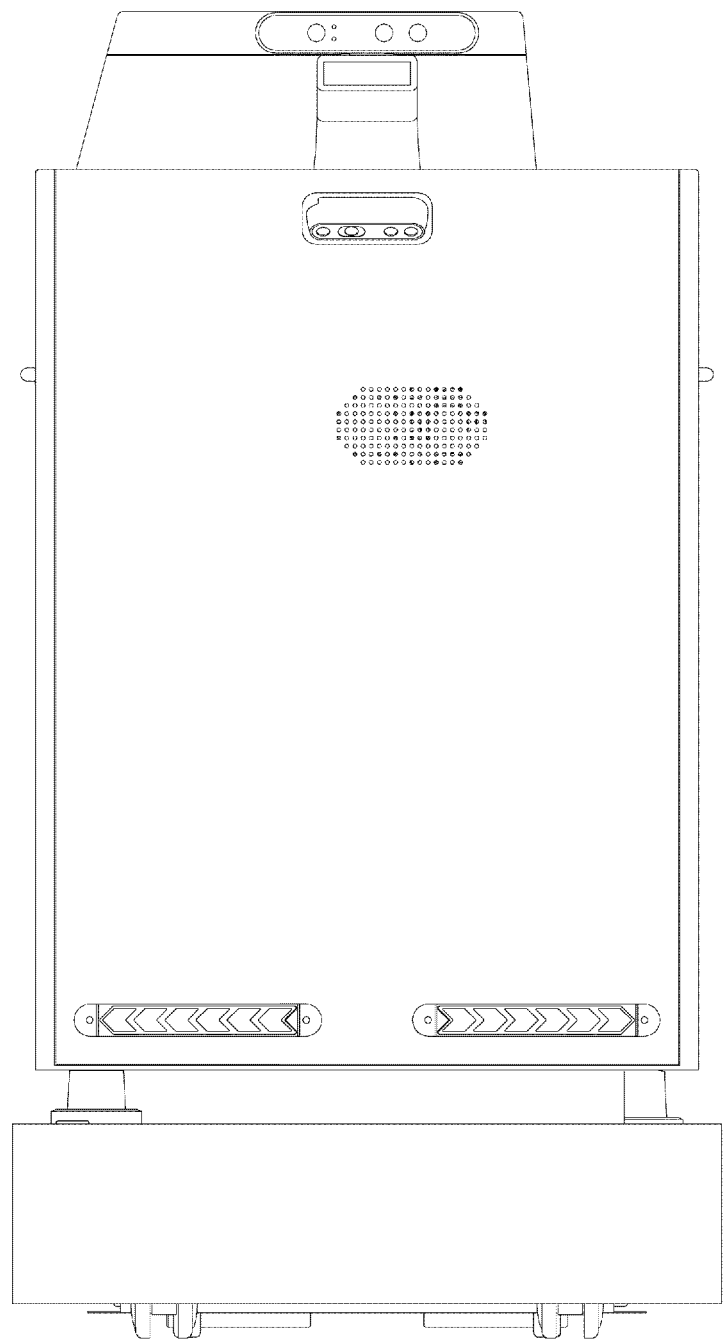
FIG. 16 is a rear view of the mobile robot.

FIG. 16 is a rear view of the autonomous moving apparatus.

Figure 17:
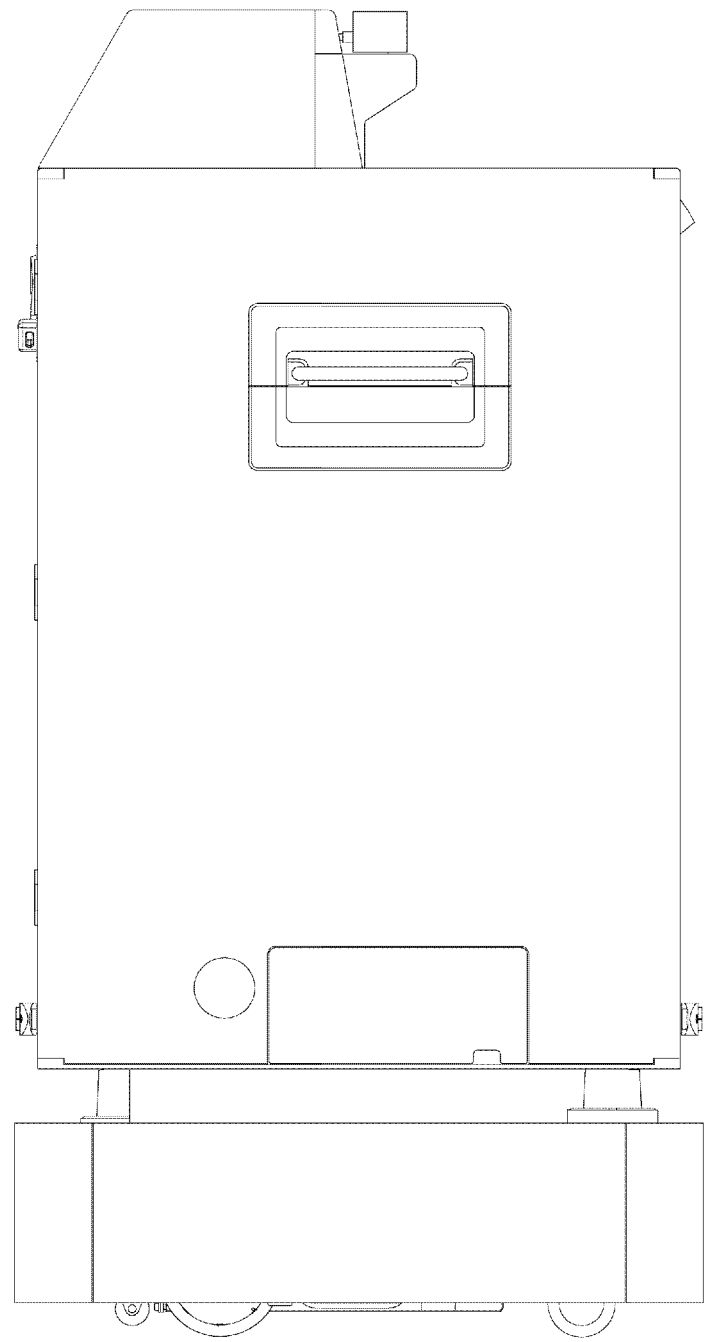
FIG. 17 is a right side view of the mobile robot.

FIG. 17 is a right side view of the autonomous moving apparatus.

Figure 18:
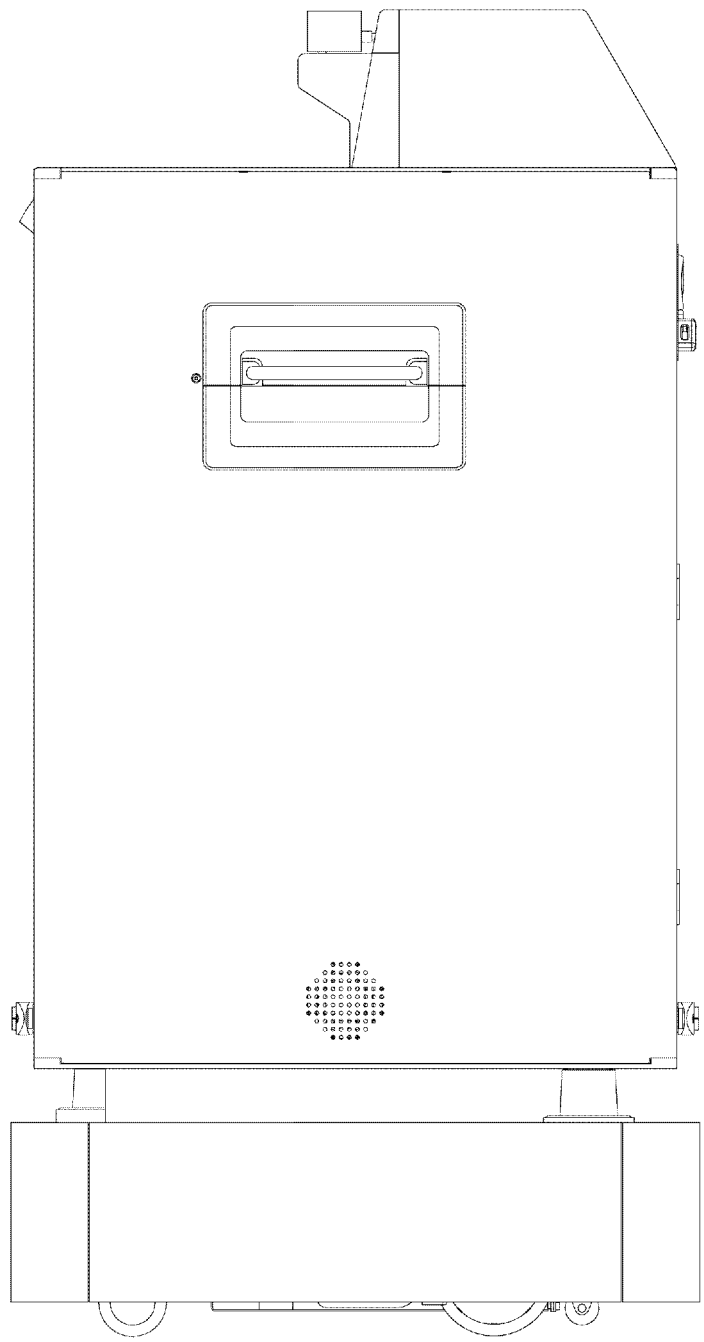
FIG. 18 is a left side view of the mobile robot.

FIG. 18 is a left side view of the autonomous moving apparatus.

Figure 19:
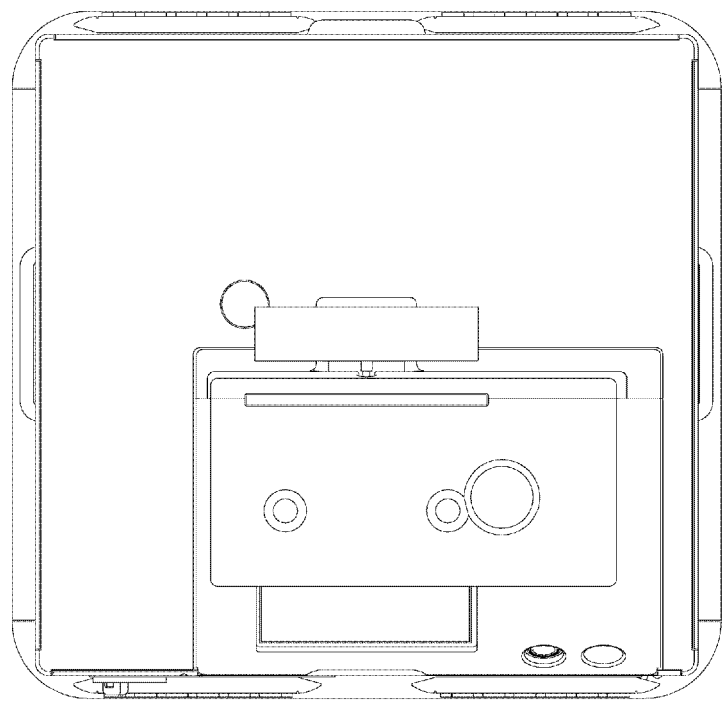
FIG. 19 is a plan view of the mobile robot.

FIG. 19 is a plan view of the autonomous moving apparatus.

Figure 20:
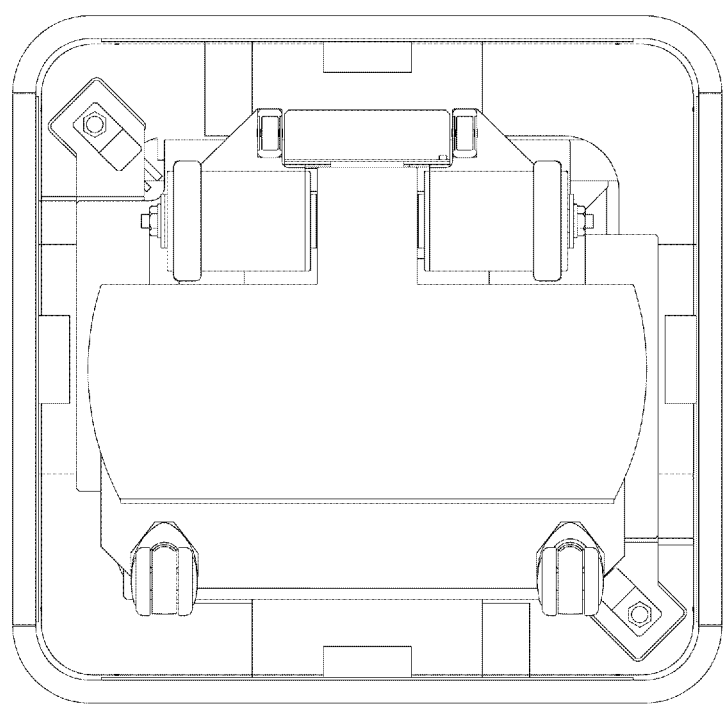
FIG. 20 is a bottom view of the mobile robot.

FIG. 20 is a bottom view of the autonomous moving apparatus.

Figure 21:
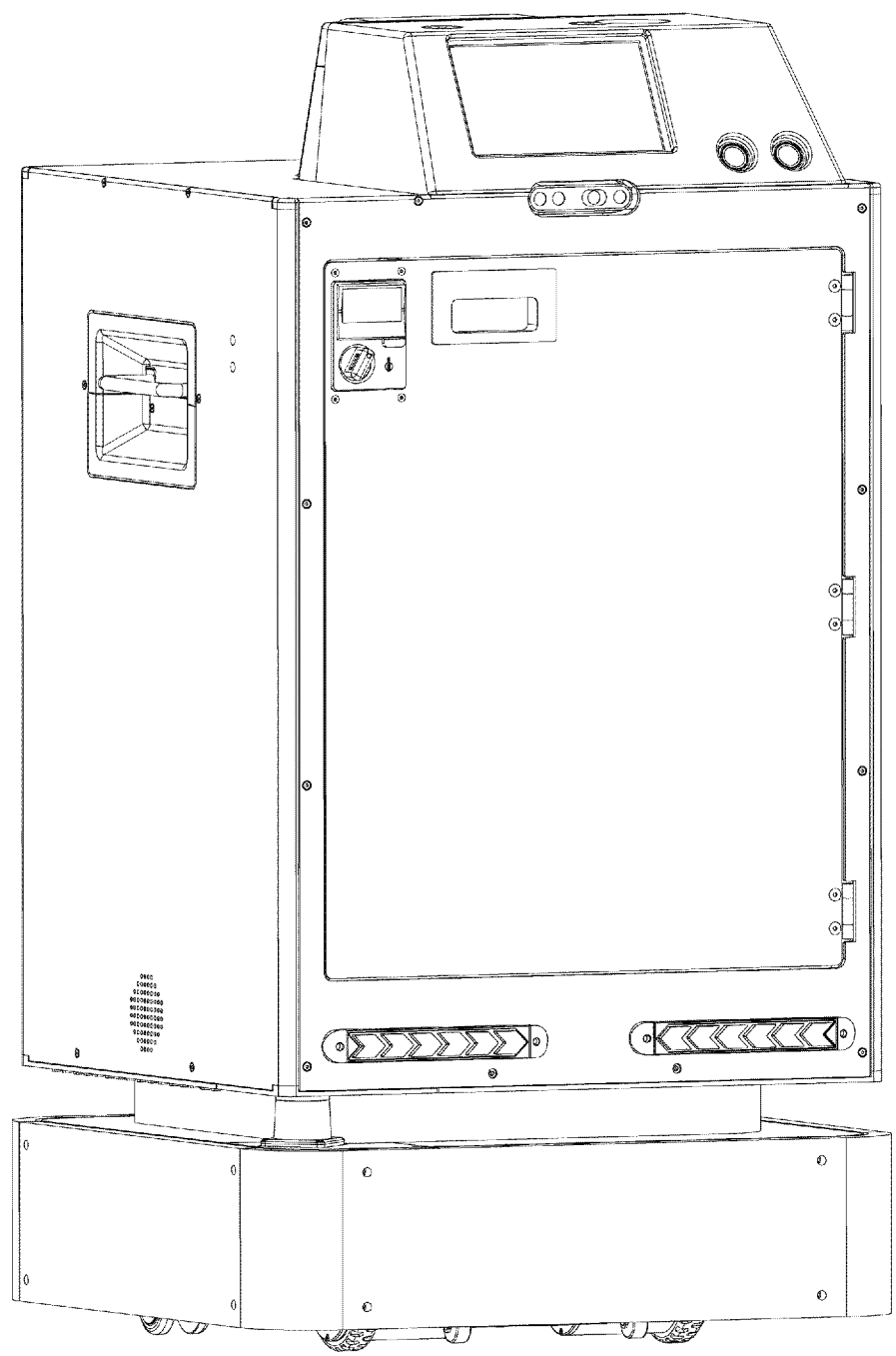
FIG. 21 is a perspective view of the mobile robot.

FIG. 21 is a perspective view of the autonomous moving apparatus.

Figure 22:
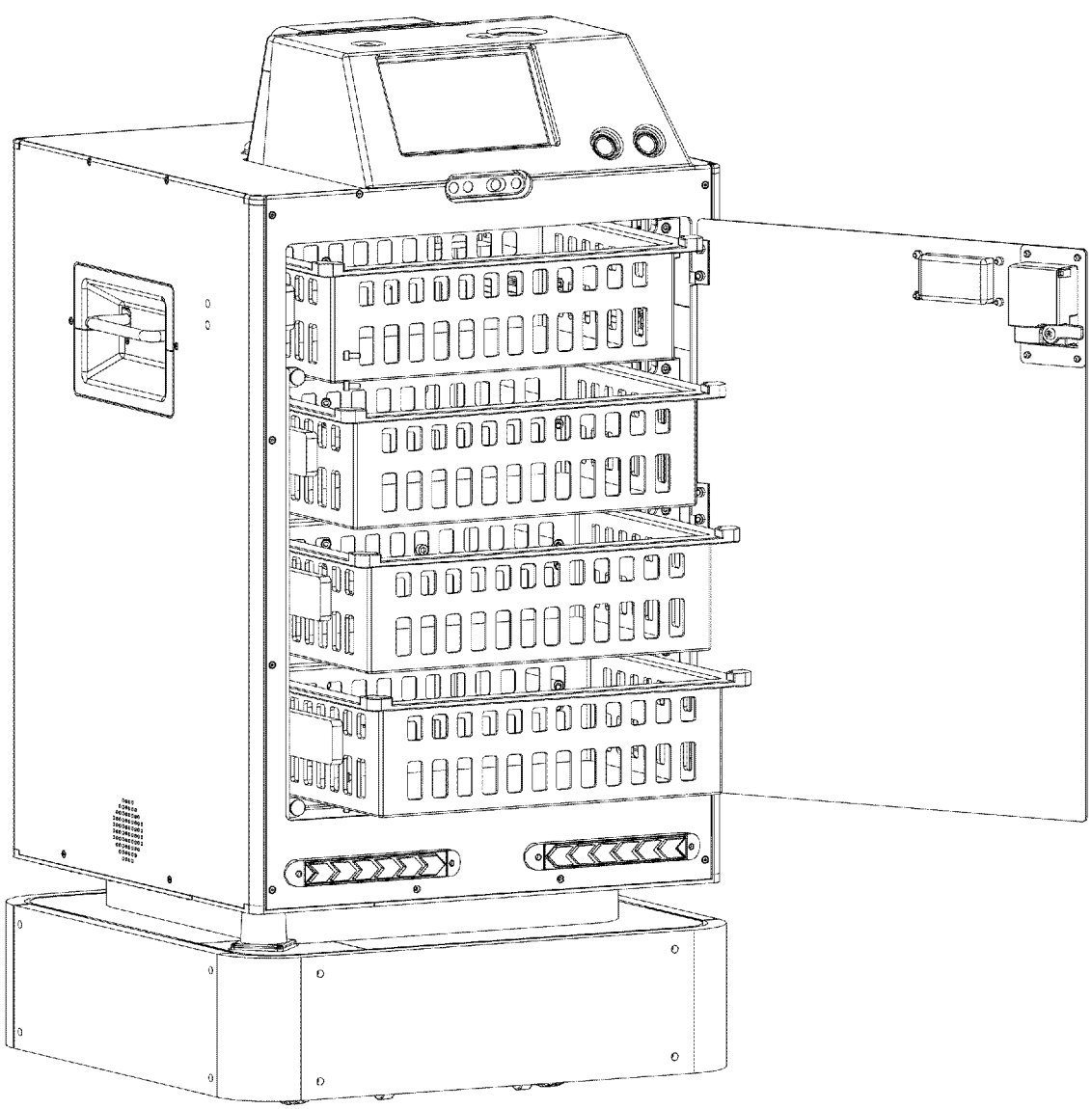
FIG. 22 is a perspective view showing an example state in which a mobile robot opens a door of a storage cabinet.

FIG. 22 is a perspective view showing an example in which the autonomous moving apparatus opens a door of a storage cabinet.

From the disclosure thus described, it will be obvious that the embodiments of the disclosure may be varied in many ways. Such variations are not to be regarded as a departure from the spirit and scope of the disclosure, and all such modified examples as would be obvious to one skilled in the art are intended for inclusion within the scope of the following claims.

What is claimed is:

1. An autonomous moving apparatus control system comprising:
   a reflection plate that is disposed in an elevator hall on a floor on which an elevator stops, and is configured to reflect signal light;
   a range sensor installed in a cage of the elevator that is configured to generate the signal light, and to detect a distance to the reflection plate by receiving reflections of the signal light transmitted to the object reflection plate; and
   a processor programmed to determine whether or not an autonomous moving apparatus should get on or off the elevator based on the detected distance.

2. The autonomous moving apparatus control system according to claim 1, wherein a plurality of reflection plates are disposed on respective elevator-stop floors in such a manner that distances between the range sensor and these reflection plates are different from one another.

3. The autonomous moving apparatus control system according to claim 2, wherein the processor is programmed to detect the elevator-stop floor based on the detected distance.

4. The autonomous moving apparatus control system according to claim 3, wherein the processor is programmed to determine that the autonomous moving apparatus should get on or off the elevator when the detected distance on the elevator-stop floor is within a target range for that floor, the target range being one of a plurality of target ranges defined for the respective elevator-stop floors on which the autonomous moving apparatus gets on and off the elevator.

5. The autonomous moving apparatus control system according to claim 1, wherein a length of the reflection plate in a vertical direction is set according to a length of a level difference between a floor surface of the cage and a floor surface of the elevator hall at a stop position of the cage.

6. The autonomous moving apparatus control system according to claim 1, wherein
   the reflection plate comprises a reflection surface inclined with respect to the vertical direction, and
   the inclination of the reflection surface is set according to the length of the level difference between the floor surface of the cage and the floor surface of the elevator hall at the stop position of the cage.

7. The autonomous moving apparatus control system according to claim 6, wherein the inclination of the reflection surface is set so that an absolute value of a difference between a reference detection distance and a first detected distance becomes larger than an absolute value of a difference between the reference detection distance and a second detected distance, the reference detection distance being a distance that is detected when the level difference is zero, the first detected distance being a distance that is detected when the level difference is a first distance having a value other than zero, and the second detected distance being a distance that is detected when the level difference is a second distance shorter than the first distance.

8. The autonomous moving apparatus control system according to claim 6, wherein
   the processor has a safe getting on/off feasible range, the safe getting on/off feasible range being a range of distances within which the autonomous moving apparatus can safely get on or off the elevator, and
   the processor determines that the autonomous moving apparatus can get on or off the elevator when the detected distance on the elevator-stop floor is within the corresponding safe getting on/off feasible range.

9. The autonomous moving apparatus control system according to claim 8, wherein the processor is programmed to determine that the autonomous moving apparatus cannot get on or off the elevator when the detected distance is not within the safe getting on/off feasible range.

10. The autonomous moving apparatus control system according to claim 1, wherein
    the range sensor also detects an unopened-door state in which an elevator door exists between the range sensor and the reflection plate, and
    the processor is programmed to make the determination based on a change in the detected distance including whether or not the elevator door is in the unopened-door state.

11. An autonomous moving apparatus control method comprising:
    detecting a distance between a cage of an elevator and a reflection plate disposed in an elevator hall on a floor on which the elevator stops; and
    determining whether or not an autonomous moving apparatus can get on or off the elevator based on the detected distance.

12. A non-transitory computer readable medium storing a control program for causing an autonomous moving apparatus control system to execute steps comprising:
    a step of detecting a distance between a cage of an elevator and a reflection plate disposed in an elevator hall on a floor on which the elevator stops; and
    a step of determining whether or not an autonomous moving apparatus can get on or off the elevator based on the detected distance.

* * * * *